(12) United States Patent
Lee et al.

(10) Patent No.: US 9,135,845 B2
(45) Date of Patent: Sep. 15, 2015

(54) DISPLAY APPARATUS INCLUDING BARRIER PANEL AND TOUCH SENSING PART

(75) Inventors: Il Ho Lee, Hwaseong-si (KR); Seongmo Hwang, Seongnam-si (KR); Jaejin Pyun, Hwaseong-si (KR); Yoongu Kim, Seongnam-si (KR); Sang Min Jeon, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 480 days.

(21) Appl. No.: 13/490,688

(22) Filed: Jun. 7, 2012

(65) Prior Publication Data

US 2013/0215076 A1 Aug. 22, 2013

(30) Foreign Application Priority Data

Feb. 21, 2012 (KR) .................. 10-2012-0017562

(51) Int. Cl.
*G09G 3/00* (2006.01)
*G06F 3/044* (2006.01)
*G09G 3/36* (2006.01)

(52) U.S. Cl.
CPC .............. *G09G 3/003* (2013.01); *G06F 3/044* (2013.01); *G09G 3/3648* (2013.01); *G06F 2203/04103* (2013.01); *G09G 2354/00* (2013.01)

(58) Field of Classification Search
CPC .............. H04N 13/0413; G06F 3/0412; G02F 1/13338
USPC .................................. 345/174, 204
See application file for complete search history.

(56) References Cited

U.S. PATENT DOCUMENTS

| 5,969,850 | A | 10/1999 | Harrold et al. | |
|---|---|---|---|---|
| 7,292,229 | B2 | 11/2007 | Morag et al. | |
| 7,663,607 | B2 | 2/2010 | Hotelling et al. | |
| 2004/0257495 | A1* | 12/2004 | Hattori et al. | 349/69 |
| 2006/0197725 | A1* | 9/2006 | Nam et al. | 345/87 |
| 2007/0030264 | A1* | 2/2007 | Song et al. | 345/419 |
| 2007/0091058 | A1* | 4/2007 | Nam et al. | 345/102 |
| 2007/0103547 | A1* | 5/2007 | Kim et al. | 348/55 |
| 2007/0195163 | A1* | 8/2007 | Chestak et al. | 348/58 |
| 2008/0211976 | A1* | 9/2008 | Nam et al. | 349/15 |
| 2008/0218459 | A1* | 9/2008 | Kim et al. | 345/87 |
| 2008/0252578 | A1* | 10/2008 | Kim et al. | 345/87 |
| 2008/0259063 | A1* | 10/2008 | Kim et al. | 345/204 |
| 2009/0224646 | A1* | 9/2009 | Kim et al. | 313/245 |
| 2009/0225243 | A1* | 9/2009 | Kim et al. | 349/15 |

(Continued)

FOREIGN PATENT DOCUMENTS

| JP | 2004-280496 | 10/2004 |
|---|---|---|
| JP | 2010-277372 | 12/2010 |

(Continued)

*Primary Examiner* — Claire X Pappas
*Assistant Examiner* — Robert Stone
(74) *Attorney, Agent, or Firm* — F. Chau & Associates, LLC

(57) ABSTRACT

A display apparatus includes a display panel that displays a second image in a 3D mode, a barrier panel that forms a barrier pattern that separates the second image into a left-eye image and a right-eye image, a touch sensing part that includes third electrodes capacitively coupled to a portion of the electrodes included in the barrier panel, and a coordinate calculator. The coordinate calculator measures a variation of capacitance between the portion of the electrodes included in the barrier panel and the third electrodes.

11 Claims, 20 Drawing Sheets

(56) References Cited

U.S. PATENT DOCUMENTS

| | | |
|---|---|---|
| 2010/0039573 A1* | 2/2010 | Park et al. .................. 349/15 |
| 2010/0289765 A1* | 11/2010 | Noguchi et al. ............ 345/173 |
| 2010/0328438 A1* | 12/2010 | Ohyama et al. .............. 348/51 |
| 2011/0057892 A1 | 3/2011 | Kwak et al. |
| 2011/0096251 A1* | 4/2011 | Son et al. .................. 349/15 |
| 2011/0109622 A1* | 5/2011 | Son et al. .................. 345/419 |
| 2011/0134056 A1 | 6/2011 | Kim et al. |
| 2011/0187832 A1 | 8/2011 | Yoshida |
| 2012/0081330 A1* | 4/2012 | Park et al. .................. 345/174 |
| 2012/0146994 A1* | 6/2012 | Jeong et al. ................ 345/419 |
| 2012/0327349 A1* | 12/2012 | Wang et al. ................ 349/139 |
| 2013/0127831 A1* | 5/2013 | Kim et al. .................. 345/419 |

FOREIGN PATENT DOCUMENTS

| | | |
|---|---|---|
| JP | 2011-170694 | 9/2011 |
| KR | 100824539 | 4/2008 |
| KR | 1020090048183 | 5/2009 |

* cited by examiner

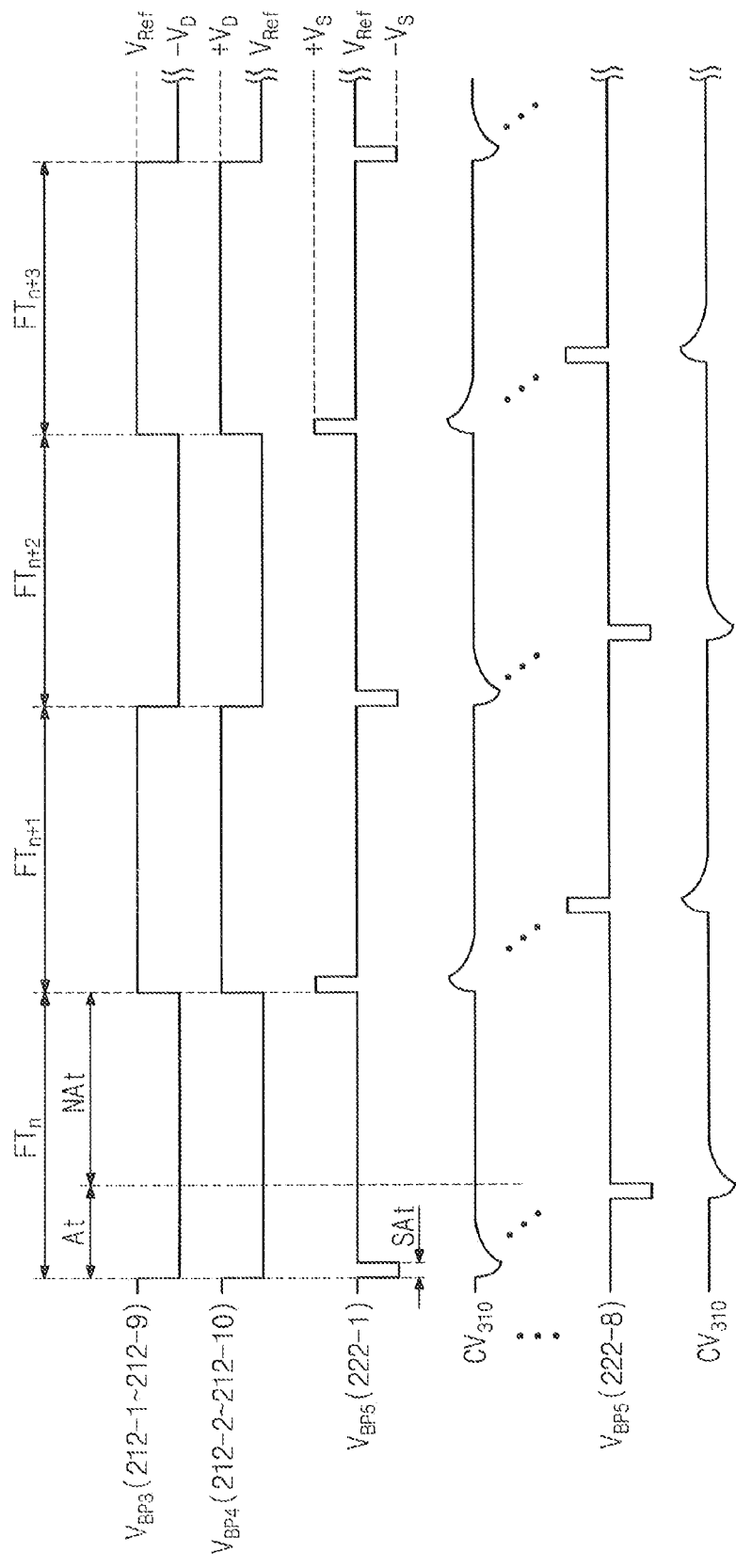

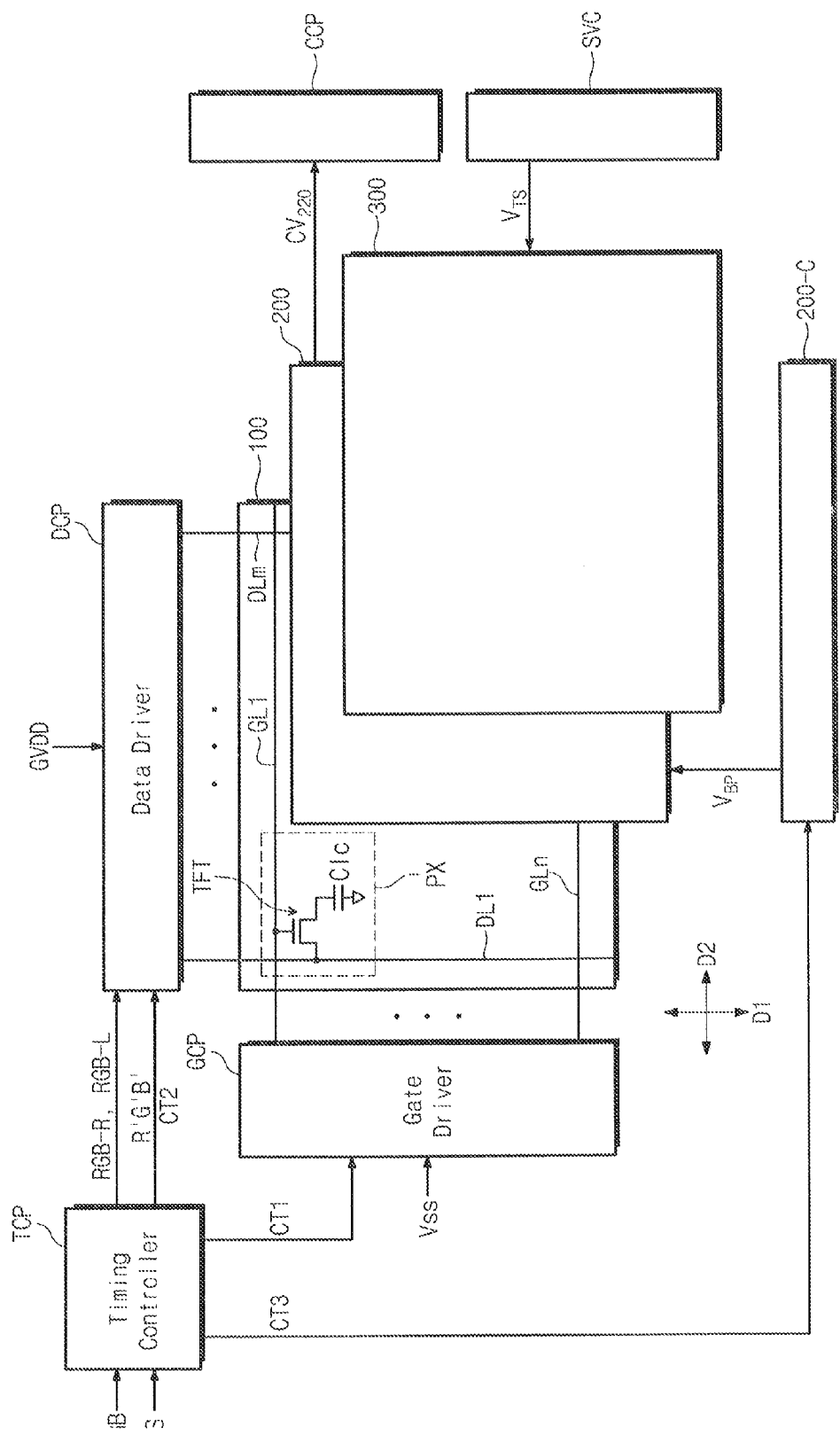

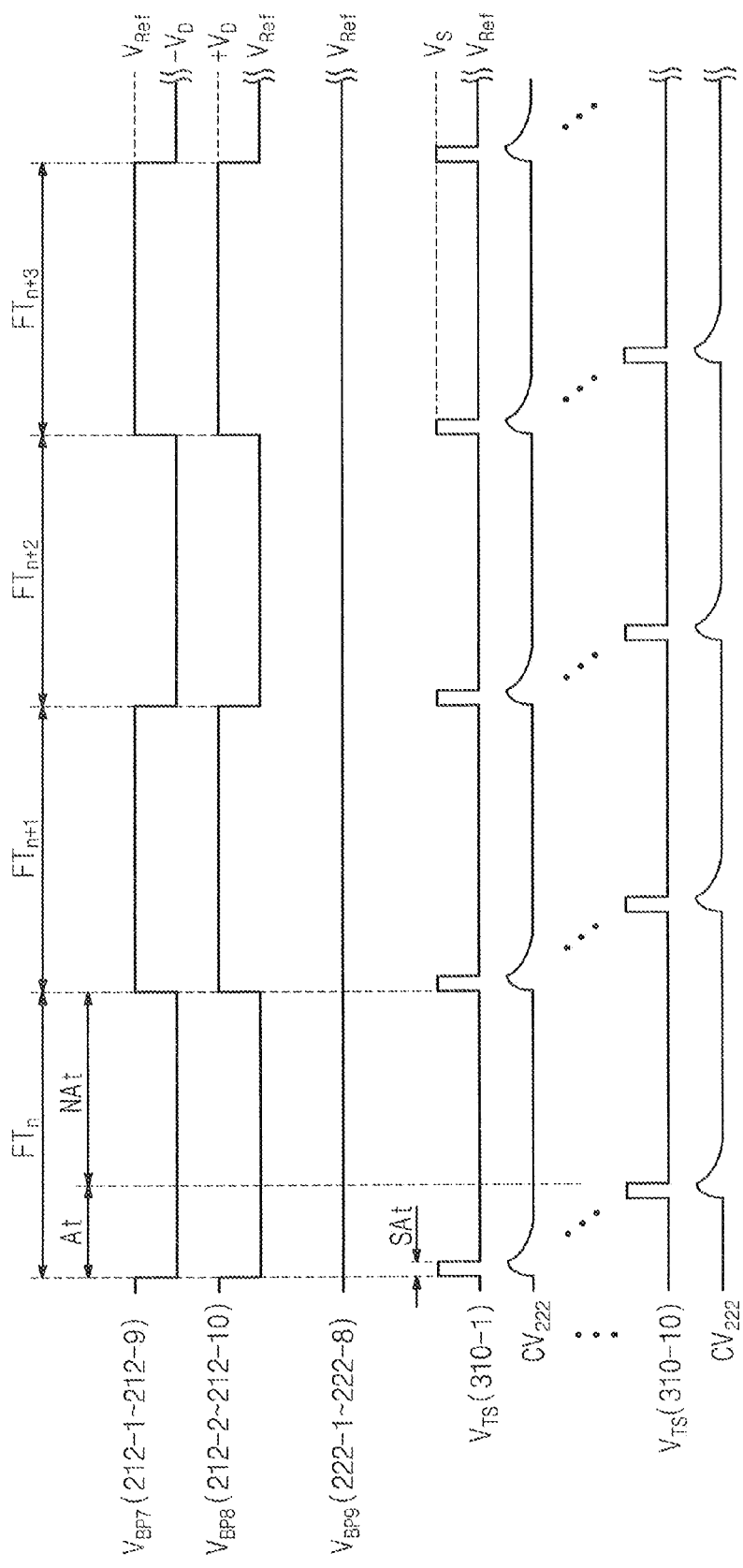

DISPLAY APPARATUS INCLUDING BARRIER PANEL AND TOUCH SENSING PART

CROSS-REFERENCE TO RELATED APPLICATION

This application claims priority under 35 U.S.C. §119 to Korean Patent Application No. 10-2012-0017562, filed on Feb. 21, 2012, the disclosure of which is incorporated by reference herein in its entirety.

TECHNICAL FIELD

The present disclosure relates to a display apparatus. More particularly, the present disclosure relates to a display apparatus capable of calculating coordinates using electrodes of a touch sensing part capacitively coupled to electrodes of a barrier panel.

DISCUSSION OF THE RELATED ART

A display panel may include a parallax barrier panel that is utilized to provide a three-dimensional (3D) image without 3D glasses. The parallax barrier panel separates an optical axis of a left-eye image from that of a right-eye image. The parallax barrier panel includes a barrier pattern in which a block part and a transmission part are alternately arranged. The barrier pattern provides the left-eye image and the right-eye image to the left and right eyes of a viewer, respectively.

In addition, a display apparatus may also include a touch panel that allows the viewer to input information by touching the display apparatus. The touch panel may be, for example, a capacitive or resistive touch panel, and is coupled to the barrier panel. A touch panel typically includes two electrode layers facing each other and spaced apart from each other. When the barrier panel and the touch panel are coupled to each other, the thickness and manufacturing cost of the display apparatus may be increased.

SUMMARY

Exemplary embodiments of the present disclosure provides a display apparatus including a touch panel integrally formed with a barrier panel.

Exemplary embodiments of the present invention provide a display apparatus including a display panel, a barrier panel, a touch sensing part, and a coordinate calculator. The display panel displays a first image every frame period in a 2D mode and displays a second image every frame period in a 3D mode.

In an exemplary embodiment, the barrier panel is disposed on the display panel and forms a barrier pattern that separates the second image into a left-eye image and a right-eye image. The barrier panel includes a plurality of first electrodes extending in a first direction and arranged in a second direction crossing the first direction, a plurality of second electrodes extending in the second direction and arranged in the first direction, and a liquid crystal layer disposed between the first electrodes and the second electrodes.

In an exemplary embodiment, the touch sensing part includes a plurality of third electrodes disposed on the second electrodes extending in the first direction, arranged in the second direction, and capacitively coupled to the second electrodes.

In an exemplary embodiment, the coordinate calculator detects a variation of a capacitance between the second electrodes and the third electrodes, and calculates coordinate information of a touch point.

In an exemplary embodiment, the display panel is divided into a plurality of display areas, each of which extends in the first direction, in the 3D mode. A first area of the display areas displays one of the left-eye image and the right-eye image at a first time point of the frame period, and a second area of the display areas, which is different from the first area, displays the other one of the left-eye image and the right-eye image.

In an exemplary embodiment, the barrier pattern includes a first barrier pattern and a second barrier pattern, which are different from each other. The first barrier pattern provides the left-eye image and the right-eye image to left and right eyes of a viewer, respectively, when the first and second areas respectively display the left-eye image and the right-eye image. The second barrier pattern provides the right-eye image and the left-eye image to the right and left eyes of the viewer, respectively, when the first and second areas respectively display the right-eye image and the left-eye image.

In an exemplary embodiment, the barrier panel is operated in synchronization with the display panel. The barrier panel is operated in a first mode and transmits the first image when the display panel is operated in the 2D mode. The barrier panel is operated in a second mode and forms the barrier pattern when the display panel is operated in the 3D mode.

In an exemplary embodiment, the display apparatus further includes a barrier panel driver that applies a driving voltage to the first electrodes and the second electrodes. The coordinate calculator is electrically connected to each of the third electrodes.

In an exemplary embodiment, when a maximum voltage of the third electrodes due to capacitance coupling in a state in which no touch event occurs is defined as a non-touch voltage, and a time period during which the non-touch voltage is decreased to a voltage before the capacitance coupling occurs is defined as a reference discharge time period, the non-touch voltage and the reference discharge time period are previously set in the coordinate calculator.

In an exemplary embodiment, the coordinate calculator measures the maximum voltage in each of the third electrodes when the second driving voltage is applied to the second electrodes. The coordinate calculator calculates coordinate information in the first direction of the touch point on the basis of a time period in which the maximum voltage lower than the non-touch voltage is measured and a time period corresponding to the first period.

In an exemplary embodiment, the coordinate calculator calculates coordinate information in the second direction of the touch point by detecting the third electrode from which the maximum voltage, which is lower than the non-touch voltage, is measured.

In an exemplary embodiment, the display apparatus further includes a barrier panel driver that applies a driving voltage to the first electrodes and the second electrodes and a sensing voltage supply part that applies a sensing voltage to the third electrodes, wherein the coordinate calculator is electrically connected to each of the second electrodes.

In an exemplary embodiment, the first and second electrodes receive a first driving voltage from the barrier panel driver during the frame period in the first mode, and the third electrodes sequentially receive the sensing voltage from the sensing voltage supply part in the first mode. The sensing voltage is activated during a portion of the first period. A voltage of the second electrodes is varied by the capacitance coupling when the second driving voltage is applied to the third electrodes, and the coordinate calculator senses the variation of the voltage of the second electrodes.

In an exemplary embodiment, a display apparatus includes a display panel configured to display an image in a 3D mode, a barrier panel disposed on the display panel and configured to separate the image into a left eye image and a right eye image, wherein the barrier panel comprises a plurality of first electrodes, a plurality of second electrodes, and a liquid crystal layer disposed between the first and second electrodes, and a touch sensing part disposed on the barrier panel and configured to detect a touch point, wherein the touch sensing part comprises a plurality of third electrodes capacitively coupled to the second electrodes, and a location of the touch input is detected based on a variation of a capacitance between the second and third electrodes.

According to exemplary embodiments of the present invention, a touch panel is replaced with the touch sensing part including one electrode layer. The display apparatus provides the touch sensing part integrally formed with the barrier panel. The coordinate information of the touch point is obtained by detecting the variation of the capacitance between the electrodes of the barrier panel and the electrodes of the touch sensing part. Thus, the number of electrode layers and the number of substrates may be reduced, and the thickness of the display apparatus may be decreased.

BRIEF DESCRIPTION OF THE DRAWINGS

The above and other features of the present invention will become more apparent by describing in detail exemplary embodiments thereof with reference to the accompanying drawings, in which:

FIG. 13 is a timing diagram showing signals occurring when the barrier panel shown in FIG. 1 is operated in a second mode, according to an exemplary embodiment of the present invention;

FIG. 14 is a block diagram showing a display apparatus, according to an exemplary embodiment of the present invention;

FIG. 17 is a timing diagram showing signals occurring when the barrier panel shown in FIG. 15 is operated in a second mode, according to an exemplary embodiment of the present invention.

DETAILED DESCRIPTION OF THE EXEMPLARY EMBODIMENTS

Figure 1:
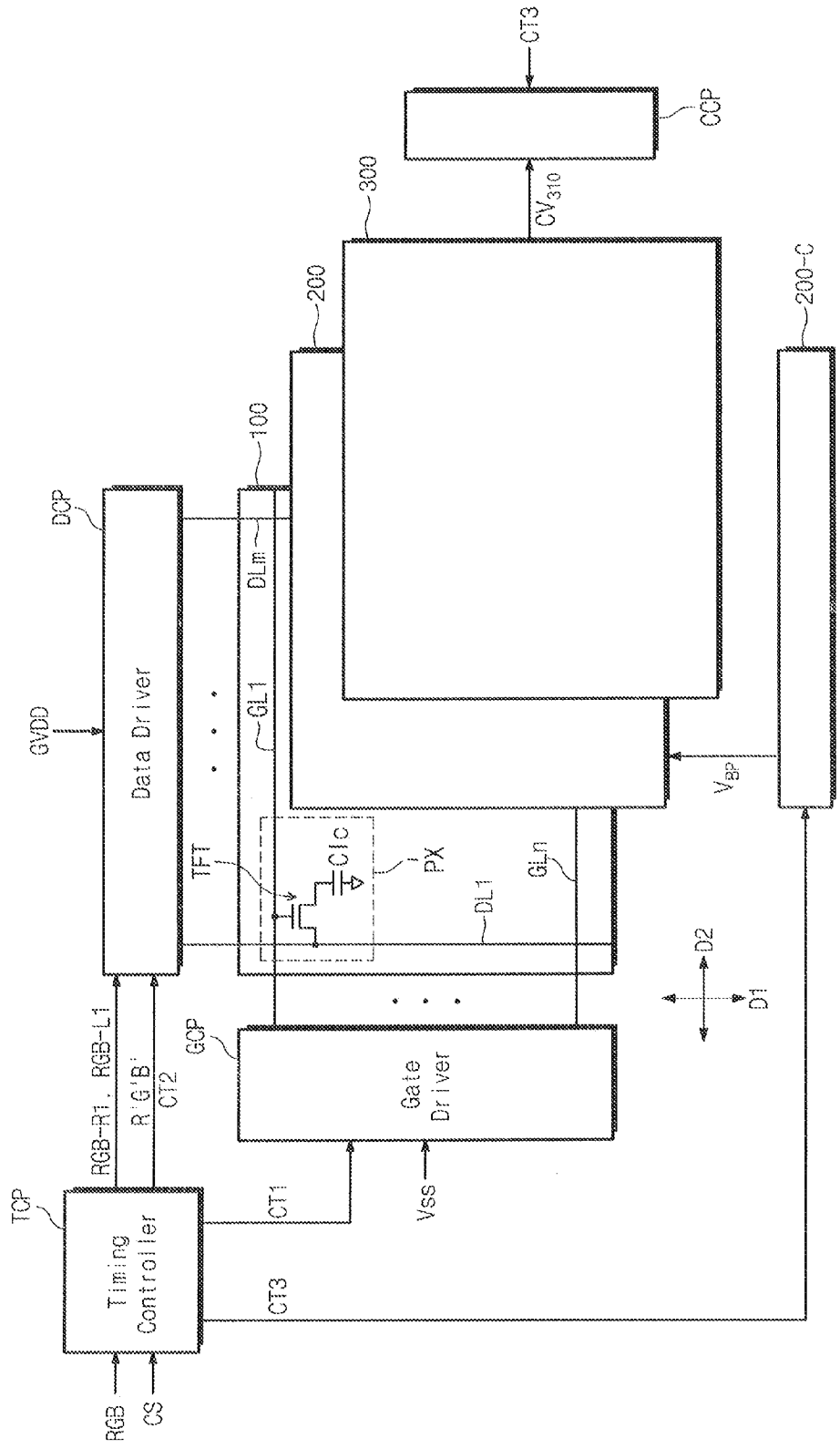
FIG. 1 is a block diagram showing a display apparatus, according to an exemplary embodiment of the present invention.

It will be understood that when an element or layer is referred to as being "on", "connected to" or "coupled to" another element or layer, it can be directly on, connected or coupled to the other element or layer or intervening elements or layers may be present.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

As used herein, the singular forms, "a", "an" and "the" are intended to include the plural forms as well, unless the context clearly indicates otherwise.

Exemplary embodiments of the present invention will be described more fully hereinafter with reference to the accompanying drawings. Like reference numerals may refer to like elements throughout the accompanying drawings.

Figure 2:
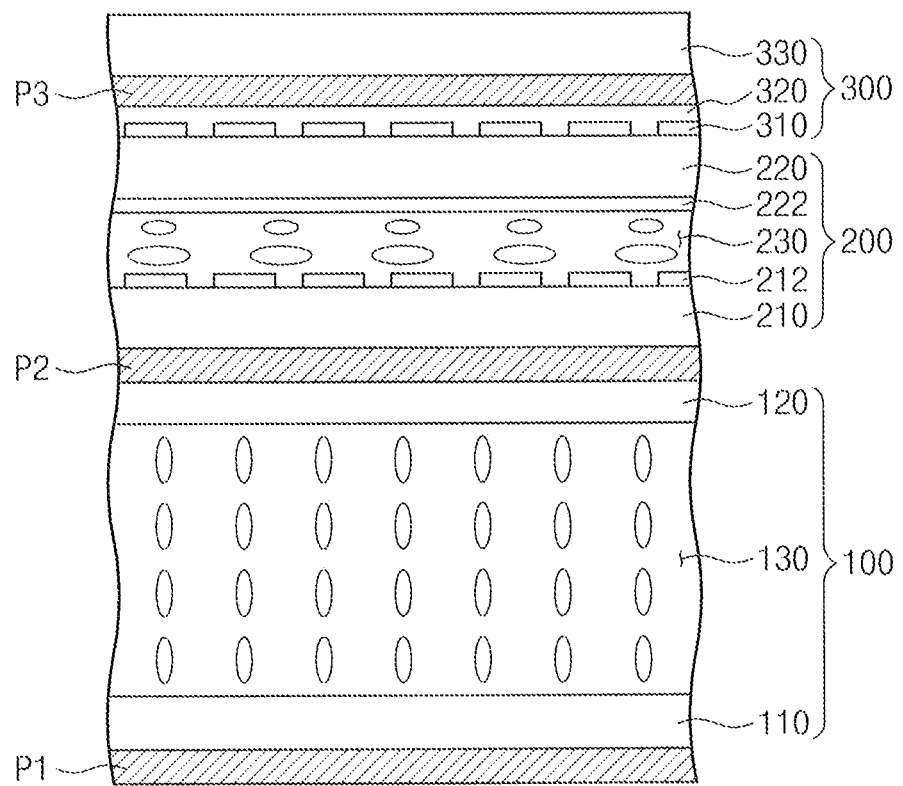
FIG. 2 is a cross-sectional view showing the display apparatus shown in FIG. 1, according to an exemplary embodiment of the present invention.

FIG. 1 is a block diagram showing a display apparatus, according to an exemplary embodiment of the present invention. FIG. 2 is a cross-sectional view showing the display apparatus shown in FIG. 1, according to an exemplary embodiment of the present invention.

Referring to FIGS. 1 and 2, a display apparatus includes a display panel 100 that displays an image, a barrier panel 200 disposed on the display panel 100, a touch sensing part 300 disposed on the barrier panel 200, and a coordinate calculator CCP electrically connected to the touch sensing part 300.

The display panel 100 displays a first image during a two-dimensional (2D) mode and a second image during a three-dimensional (3D) mode. The display apparatus is operated in the 2D mode or the 3D mode according to a signal input by a viewer. The first image is provided to the viewer as a 2D image and the second image is provided to the viewer as a 3D image.

The display panel 100 may be one of various types of display panels. For example, the display panel 100 may be a liquid crystal display panel, an organic light emitting display panel, an electrophoretic display panel, or an electro-wetting display panel.

In an exemplary embodiment, the display panel 100 is a liquid crystal display panel. The display apparatus includes first and second polarizing plates P1 and P2 facing each other, the liquid crystal display panel 100 interposed therebetween, and a backlight unit that provides light to the liquid crystal display panel 100. In exemplary embodiments including display panels other than the liquid crystal display panel, the first polarizing plate P1 may be omitted.

As shown in FIG. 1, the display panel 100 includes a plurality of gate lines GL1 to GLn and a plurality of data lines DL1 to DLm. The data lines DL1 to DLm are insulated from the gate lines GL1 to GLn.

The gate lines GL1 to GLn are arranged in a first direction D1 and extend in a second direction D2 crossing the first direction D1. The data lines DL1 to DLm are arranged in the second direction D2 and extend in the first direction D1. The first direction D1 may be referred to as a column direction and the second direction D2 may be referred to as a row direction.

Figure 5:
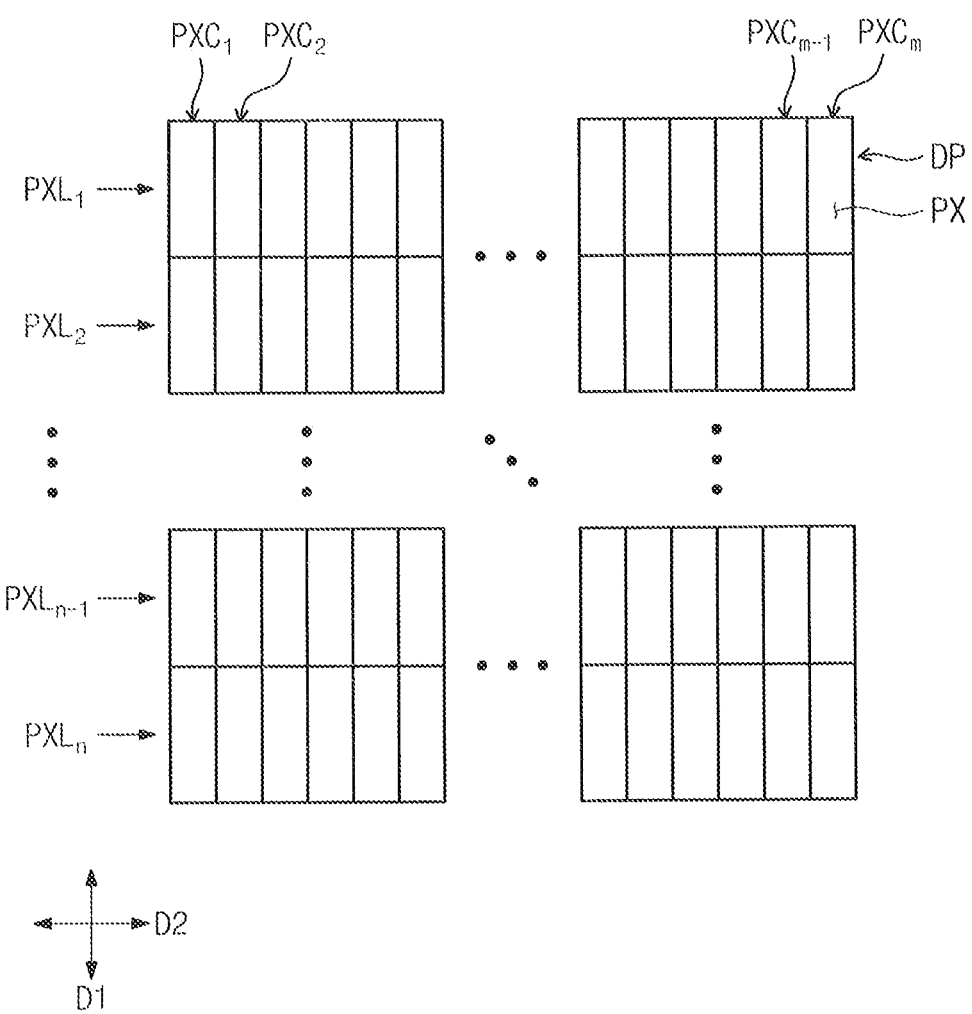
FIG. 5 is a view showing the display panel shown in FIG. 1, according to an exemplary embodiment of the present invention.

In addition, the display panel 100 includes a plurality of pixels PX, each of which is electrically connected to a corresponding data line of the data lines DL1 to DLm and a corresponding gate line of the gate lines GL1 to GLn. The pixels PX are arranged in a matrix form. For example, the pixels PX may be arranged in a plurality of pixel rows $PXL_1$ to $PXL_n$ and a plurality of pixel columns $PXC_1$ to $PXC_m$, as shown in FIG. 5.

Each pixel PX includes a thin film transistor TFT that outputs a data voltage in response to a gate voltage, and a liquid crystal capacitor Clc that receives the data voltage. The thin film transistor TFT is electrically connected to a corresponding gate line of the gate lines GL1 to GLn, and a corresponding data line of the data lines DL1 to DLm. Each pixel PX may further include a storage capacitor.

The thin film transistor TFT includes a gate electrode, an active layer, a source electrode, and a drain electrode. The gate electrode, the active layer, and the source electrode may be disposed on different layers from each other. The source electrode and the drain electrode may be disposed on the same layer.

As shown in FIG. 2, the display panel 100 includes a first substrate 110, a second substrate 120, and a liquid crystal layer 130 disposed between the first substrate 110 and the second substrate 120. The thin film transistor TFT, the gate lines GL1 to GLn, and the data lines DL1 to DLm are disposed on one of the first substrate 110 and the second substrate 120.

The liquid crystal capacitor Clc includes a first electrode electrically connected to the thin film transistor TFT, a second electrode disposed on a different layer from the first electrode, and a dielectric layer disposed between the first electrode and the second electrode. For example, the first electrode may be disposed on the first substrate 110 and the second electrode may be disposed on the second substrate 120. In this case, the dielectric layer may be the liquid crystal layer 130.

The first electrode and the second electrode may be disposed on the first substrate 110 while interposing an insulating layer therebetween. In this case, the insulating layer disposed between the first and second electrodes may serve as the dielectric layer.

The second electrode is disposed on one of the first substrate 110 and the second substrate 120, and a voltage having a different level from that of a voltage applied to the first electrode is applied to the second electrode. The first electrode may be a pixel electrode and the second electrode may be a common electrode.

In addition, a color filter is disposed on the first substrate 110 or the second substrate 120. The color filter allows the light passing through the liquid crystal layer 130 to have a predetermined color. For example, red, green, and blue color filters may be prepared to respectively correspond to three successive pixels.

The barrier panel 200 is operated in synchronization with the display panel 100. The barrier panel 200 is operated in the first mode when the display panel 100 is operated in the 2D mode, and the first image is transmitted. In addition, the barrier panel 200 is operated in the second mode when the display panel 100 is operated in the 3D mode, and the barrier pattern is formed.

As shown in FIG. 2, the barrier panel 200 includes a plurality of first electrodes 212, a plurality of second electrodes 222 (e.g., 222-1 to 222-8 in FIG. 3B) facing the first electrodes 212, and a liquid crystal layer 230 interposed between the first electrodes 212 and the second electrodes 222.

The barrier panel 200 includes a first barrier substrate 210 on which the first electrodes 212 are arranged, and a second barrier substrate 220 on which the second electrodes 222 are arranged. In an exemplary embodiment, the first electrode 212 may be directly arranged on an upper surface of the second substrate 120 of the display panel 100.

Figure 3A:
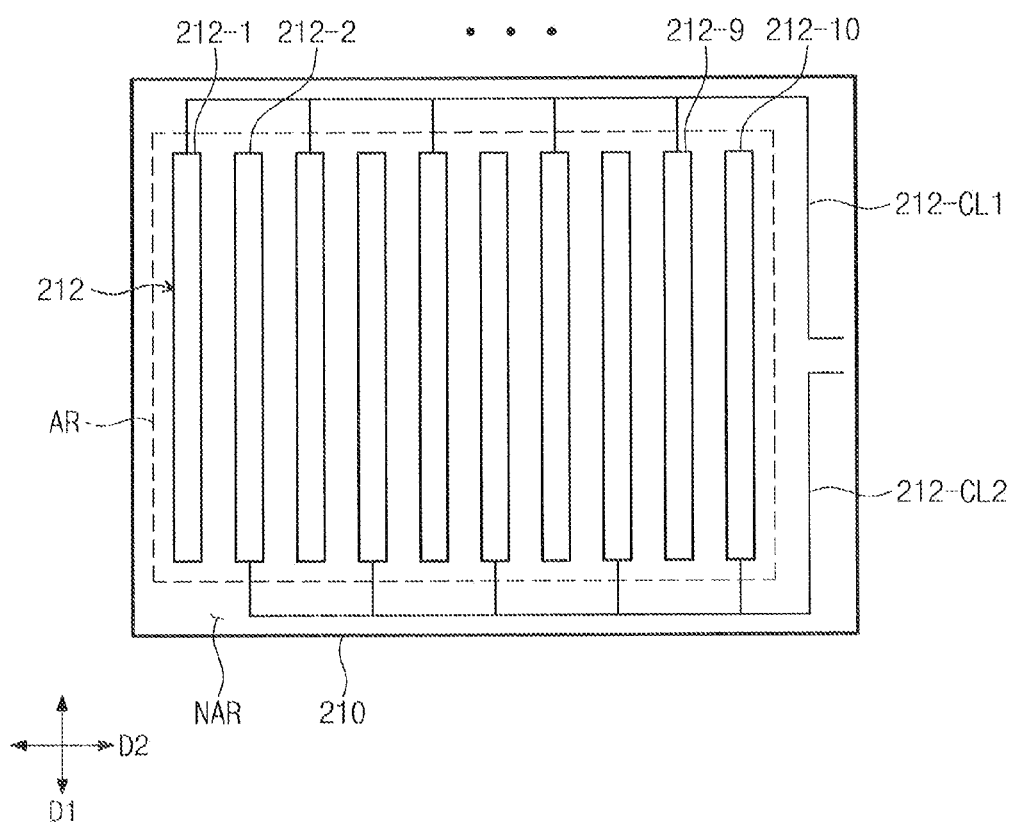
FIGS. 3A and 3B are plan views showing first and second electrodes of a barrier panel shown in FIG. 1, according to an exemplary embodiment of the present invention.
Figure 3B:
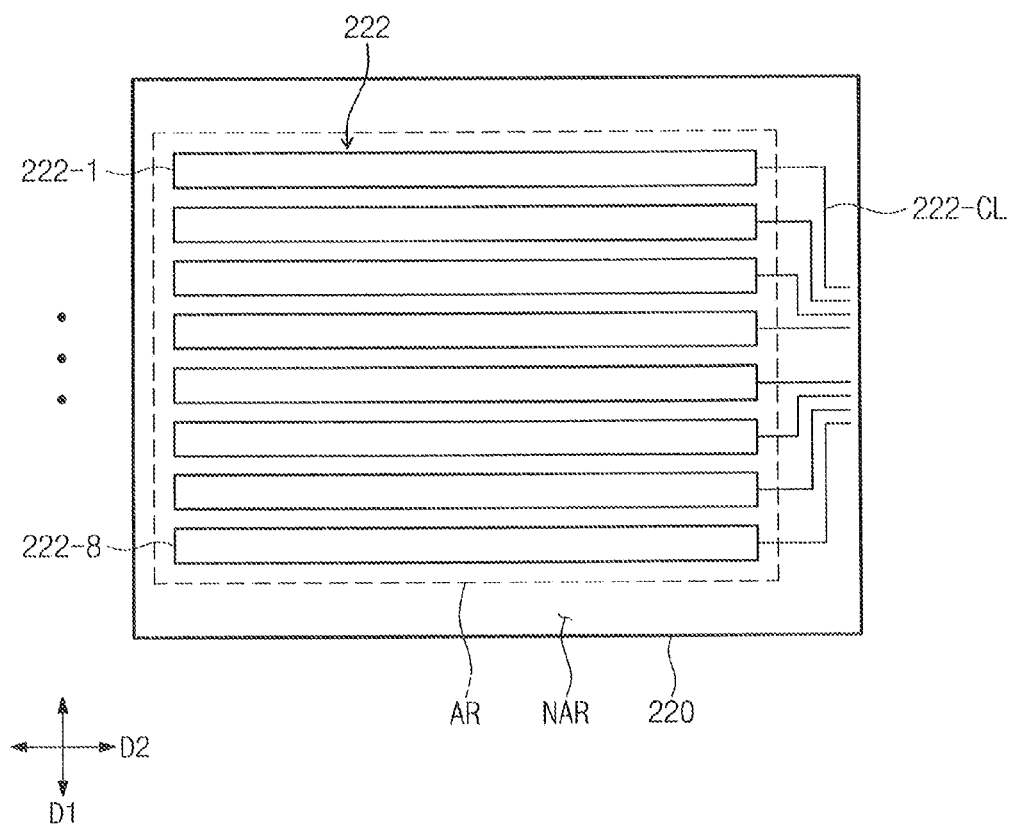

FIGS. 3A and 3B are plan views showing the first and second electrodes of the barrier panel shown in FIG. 1, according to an exemplary embodiment of the present invention.

Referring to FIG. 3A, the first electrodes 212 extend in the first direction D1 and are arranged in the second direction D2. In addition, as shown in FIG. 3B, the second electrodes 222 extend in the second direction D2 and are arranged in the first direction D1.

In the exemplary embodiment described above, the first direction D1 in which the data lines DL1 to DLm extend is the same as the first direction D1 in which the first electrodes 212 extend, however, exemplary embodiments of the present invention are not limited thereto. In addition, ten first electrodes 212-1 to 212-10 and eight second electrodes 222-1 to 222-8 are shown in FIGS. 3A and 3B, however, the number of first and second electrodes is not limited thereto.

As shown in FIG. 3A, a first wire 212-CL1 and a second wire 212-CL2 are disposed on the first barrier substrate 210. The first wire 212-CL1 is connected to odd-numbered electrodes 212-1 to 212-9 among the first electrodes 212-1 to 212-10. In addition, the second wire 212-CL2 is connected to even-numbered electrodes 212-2 to 212-10 among the first electrodes 212-1 to 212-10. In an exemplary embodiment, the first wire 212-CL1 and the second wire 212-CL2 may be replaced with ten wires respectively connected to the first electrodes 212-1 to 212-10.

As shown in FIG. 3B, third wires 222-CL are disposed on a surface of the second barrier substrate 220. The third wires 222-CL are connected to the second electrodes 222-1 to 222-8, respectively.

The barrier panel 200 includes an active area AR and a non-active area NAR adjacent to the active area AR. The image (e.g., light displaying information) generated by the display panel 100 passes through the active area AR and does not pass through the non-active area NAR. When viewed in a plan view, the first electrodes 212-1 to 212-10 or the second electrodes 222-1 to 222-8 are arranged in the active area AR, and the first and second wires 212-CL1 and 212-CL2 or the third wires 222-CL are arranged in the non-active area NAR.

The first barrier substrate 210 and the second barrier substrate 220 may be transparent members, such as, for example, glass or plastic. The first electrodes 212 and the second electrodes 222 may include a transparent conductive material, such as, for example, indium tin oxide (ITO), indium zinc oxide (IZO), tin oxide (SnO2), zinc oxide (ZnO), etc.

In addition, the first electrodes 212-1 to 212-10 may have the same or substantially the same width as each other and may be spaced apart from each other at regular intervals. The second electrodes 222-1 to 222-8 may have the same or substantially the same width as each other and may be spaced apart from each other at regular intervals.

The liquid crystal layer 230 is sealed between the first barrier substrate 210 and the second barrier substrate 220. The liquid crystal layer 230 may be sealed by a sealant poured along an edge of the first and second barrier substrates 210 and 220.

The liquid crystal layer 230 contains liquid crystal molecules having a twisted nematic orientation. The liquid crystal molecules having the twisted nematic orientation are continuously twisted from a surface of the first barrier substrate 210 to a surface of the second barrier substrate 220. However, the liquid crystal molecules are not limited to a twisted nematic orientation. For example, in exemplary embodiments, the liquid crystal layer 230 may include liquid crystal molecules in a vertical alignment.

As shown in FIG. 2, the touch sensing part 300 includes a plurality of third electrodes 310 disposed above the second electrodes 222. The third electrodes 310 are arranged on the second barrier substrate 220. The second electrodes 222 are disposed on a surface of the second barrier substrate 220, and the third electrodes 310 are disposed on the opposing surface of the second barrier substrate 220.

The third electrodes 310 are capacitance-coupled to the second electrodes 222. The capacitance between the third electrodes 310 and the second electrodes 222 changes according to the occurrence of a touch event.

The coordinate calculator CCP shown in FIG. 1 is electrically connected to the third electrodes 310, senses a change in the capacitance between the third electrodes 310 and the second electrodes 222, and calculates coordinate information of a position at which the touch event occurs. The coordinate calculator CCP is described in further detail below.

The touch sensing part 300 further includes a window member 330 that covers the third electrodes 310. The window member 330 is coupled to the third electrodes 310 by an adhesive layer 320 and provides a touch surface to the viewer. The window member 330 may be, for example, reinforced glass or reinforced plastic.

Figure 4:
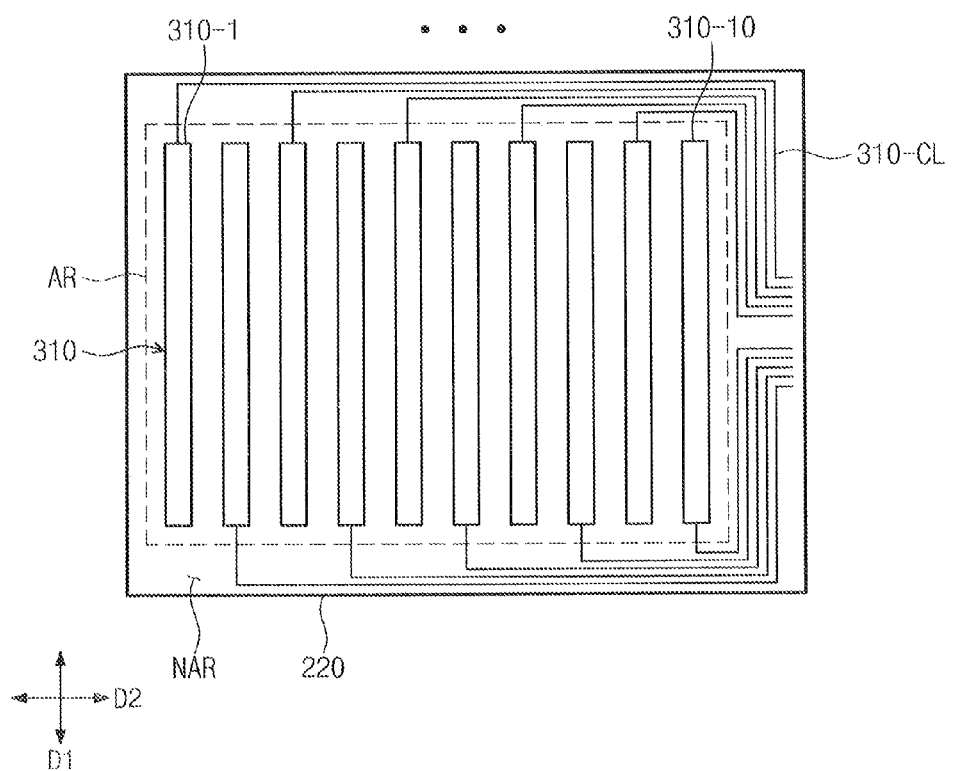
FIG. 4 is a plan view showing third electrodes of a touch sensing part shown in FIG. 1, according to an exemplary embodiment of the present invention.

FIG. 4 is a plan view showing third electrodes of a touch sensing part shown in FIG. 1, according to an exemplary embodiment of the present invention.

Referring to FIG. 4, the third electrodes 310-1 to 310-10 extend in the first direction D1 and are arranged in the second direction D2. In FIG. 4, ten third electrodes 310-1 to 310-10 are shown, however, the number of the third electrodes 310-1 to 310-10 is not limited thereto.

Fourth wires 310-CL are disposed on a surface of the second barrier substrate 220. The fourth wires 310-CL are connected to the third electrodes 310-1 to 310-10, respectively. The third electrodes 310-1 to 310-10 may include the same material as the first electrodes 212. In addition, the third electrodes 310-1 to 310-10 may have the same or substantially the same width as each other and may be spaced apart from each other at regular intervals.

As shown in FIG. 2, the display apparatus includes a third polarizing plate P3 facing the second polarizing plate P2. The second electrodes 222 are interposed between the second and third polarizing plates P2 and P3. As shown in FIG. 2, the third polarizing plate P3 is attached to a lower surface of the window member 330, however, exemplary embodiments are not be limited thereto. For example, the third polarizing plate P3 may be disposed above the second electrodes 222-1 to 222-8, and the position of the third polarizing plate P3 may be varied.

The third polarizing plate P3 may have a transmission axis substantially perpendicular to a transmission axis of the second polarizing plate P2. In this case, the barrier panel 200 including the liquid crystal molecules having the twisted nematic orientation transmits the light incident thereto in the first mode. That is, the barrier panel 200 is operated in a normally white mode (e.g., light is transmitted when no electric field is applied to the liquid crystal molecules).

Hereinafter, the display panel 100 operated in the 2D mode will be described with reference to FIGS. 1 and 5 to 7.

Figure 6:
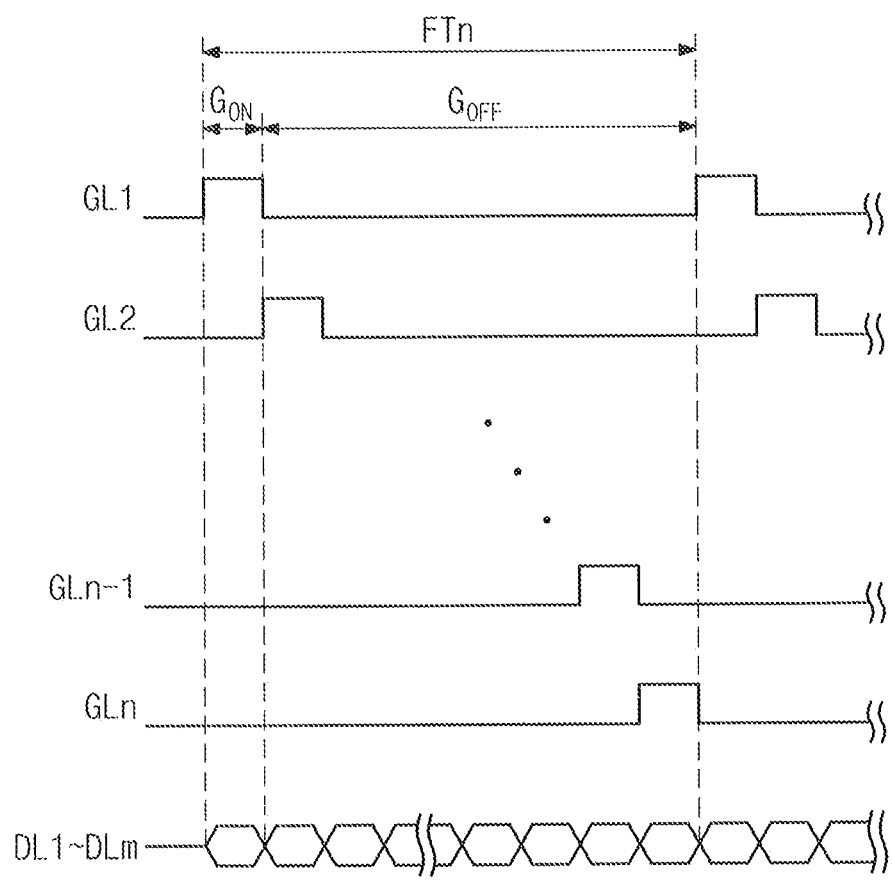
FIG. 6 is a timing diagram showing gate-on voltages applied to the display panel shown in FIG. 1, according to an exemplary embodiment of the present invention.
Figure 7:
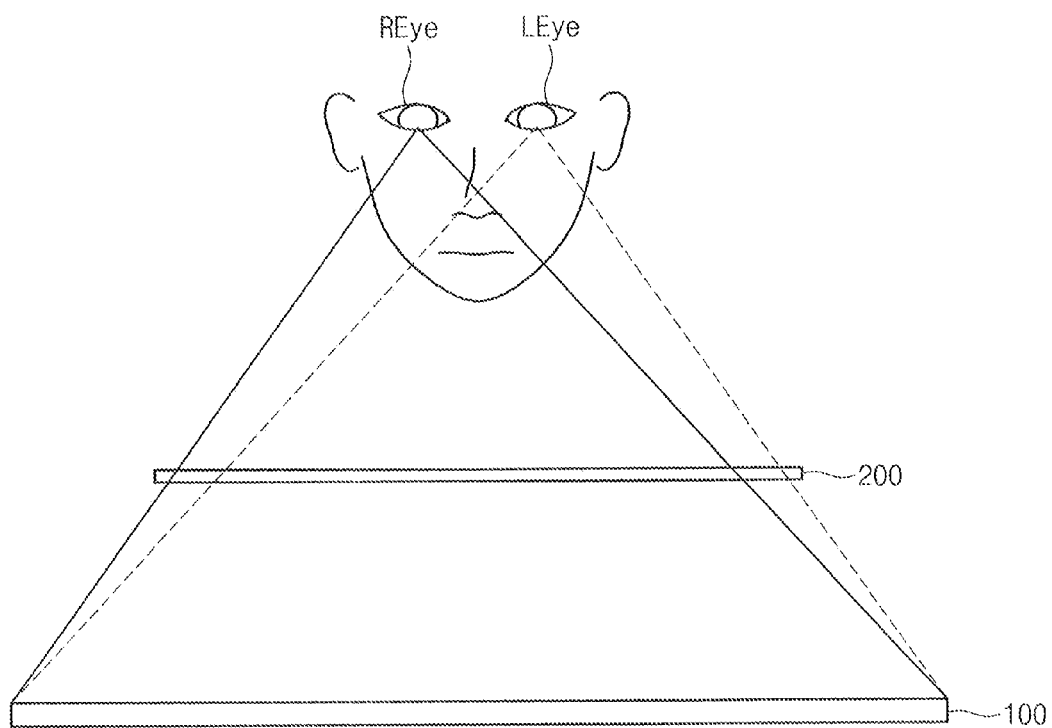
FIG. 7 is a view showing a display apparatus that displays a first image, according to an exemplary embodiment of the present invention.

FIG. 5 is a view showing the display panel shown in FIG. 1, according to an exemplary embodiment of the present invention. FIG. 6 is a timing diagram showing gate-on voltages applied to the display panel shown in FIG. 1, according to an exemplary embodiment of the present invention. FIG. 7 is a view showing a display apparatus that displays a first image, according to an exemplary embodiment of the present invention.

The display apparatus further includes a driving circuit that drives the display panel 100, and a barrier panel driver 200-C that drives the barrier panel 200. The driving circuit includes a timing controller TCP, a gate driver GCP, and a data driver DCP.

As shown in FIG. 1, the timing controller TCP receives an input image signal ROB and various control signals CS from an external graphic controller. The timing controller TCP controls the gate driver GCP and the data driver DCP in the 2D mode in response to a 2D mode selection signal provided through a user interface, or a 2D identification code extracted from the input image signal RGB.

In addition, the timing controller TCP converts the input image signal RGB to image data R'G'B', which is an appropriate format for operating conditions of the display panel 100 in the 2D mode, and outputs the image data R'G'B'. The timing controller TCP receives various signals, such as, for example, a vertical synchronization signal, a horizontal synchronization signal, a main clock, and a data enable signal, and utilizes these various signals to output first, second, and third control signals CT1, CT2, and CT3.

The first control signal CT1 is used to control the operation of the gate driver GCP. The first control signal CT1 includes a vertical start signal that starts the operation of the gate driver GCP, a gate clock signal that determines an output timing of the gate voltage, and an output enable signal that determines a pulse width of the gate-on voltage. In addition, the first control signal CT1 includes a 2D synchronization signal.

The second control signal CT2 is used to control the operation of the data driver DCP. The second control signal CT2 includes a horizontal start signal that starts the operation of the data driver DCP, an inversion signal that inverts a polarity of the data voltage, and an output indicating signal that determines an output timing of the data voltage from the data driver DCP.

The third control signal CT3 is used to control the barrier panel 200. The third control signal CT3 includes the 2D synchronization signal, which synchronizes the barrier panel 200 with the display panel 100.

As shown in FIG. 1, the gate driver GCP receives a first control signal CT1 and a gate driving voltage Vss. The gate driver GCP outputs the gate voltage in response to the first control signal CT1.

As shown in FIG. 6, the gate driver GCP sequentially outputs the gate voltage to the gate lines GL1 to GLn during a frame period FTn. Accordingly, the gate lines GL1 to GLn receive the gate voltage in different periods from each other.

The gate voltage is activated during a portion of the frame period $FT_n$. Among the frame period $FT_n$, the period during which the gate voltage is activated is referred to as a gate-on period Gon, and the remainder of the period is referred to as a gate-off period Goff.

The gate voltage includes the gate-on voltage and the gate-off voltage. The gate-on voltage is applied to the gate lines GL1 to GLn during the gate-on period Gon, and the gate-off voltage is applied to the gate lines GL1 to GLn during the gate-off period Goff.

As shown in FIG. 5, the pixels PX are divided into the pixel rows $PXL_1$ to $PXL_n$, and the gate lines GL1 to GLn are disposed to correspond to the pixel rows $PXL_1$ to $PXL_n$, respectively. Thus, each of the pixel rows $PXL_1$ to $PXL_n$, is activated in response to the gate-on voltage provided through a corresponding gate line of the gate lines GL1 to GLn.

As shown in FIG. 1, the data driver DCP receives the image data R'G'B' from the timing controller TCP. In addition, the data driver DCP converts the image data R'G'B' to the data voltages with reference to a gamma reference voltage GVDD, and outputs the data voltages to the data lines DL1 to DLm. As shown in FIG. 6, the data driver DCP applies the data voltages to the data lines DL1 to DLm every gate-on period Gon.

As shown in FIG. 7, the display panel 100 displays the first image every frame period in the 2D mode.

Hereinafter, the barrier panel 200 and the touch sensing part 300 operated in the first mode will be described with reference to FIGS. 7 to 9.

Figure 8:
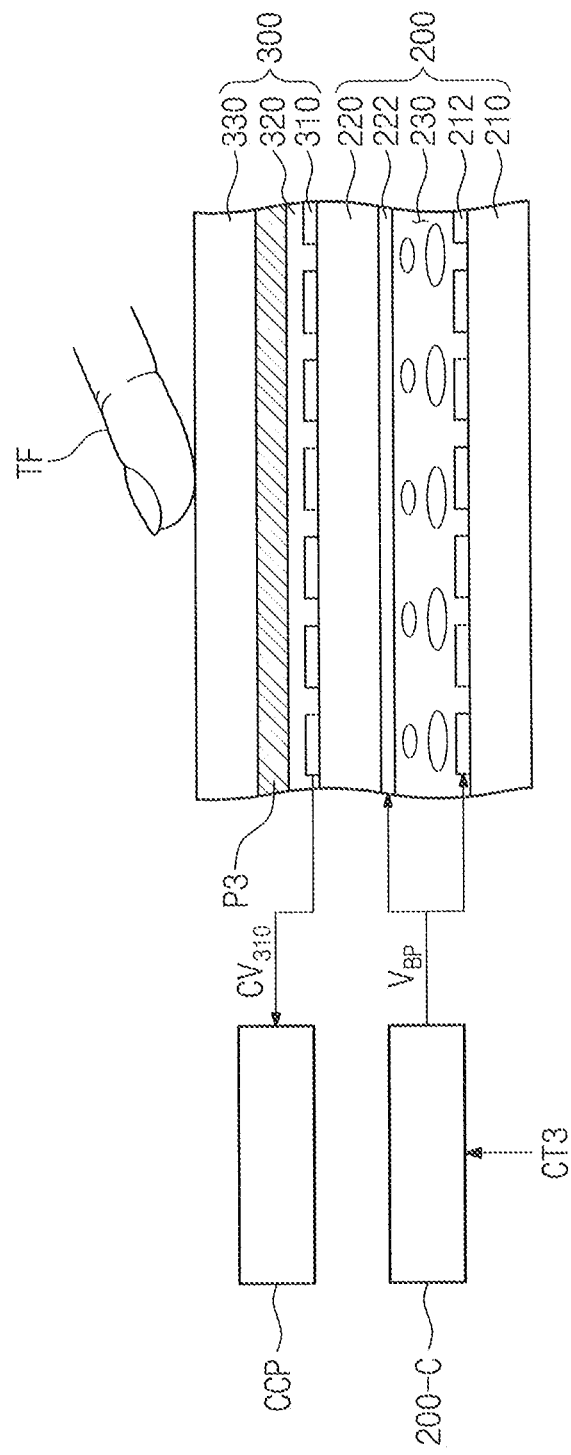
FIG. 8 is a view showing a signal transmission path in a barrier panel and a touch sensing part, according to an exemplary embodiment of the present invention.

FIG. 8 is a view showing a signal transmission path in a barrier panel and a touch sensing part, according to an exemplary embodiment of the present invention. FIG. 9 is a timing diagram showing signals occurring when the barrier panel shown in FIG. 1 is operated in a first mode, according to an exemplary embodiment of the present invention.

Referring to FIG. 7, the barrier panel 200 does not form the barrier pattern in the first mode when the first image is transmitted. Therefore, the first image is provided to both the left eye LEye and the right eye REye of the viewer. There is no difference between the first image provided to the left eye LEye and the first image provided to the right eye REye in the first mode.

Referring to FIG. 8, the barrier panel driver 200-C applies a driving voltage $V_{BP}$ to the barrier panel 200 in response to the third control signal CT3.

Figure 9:
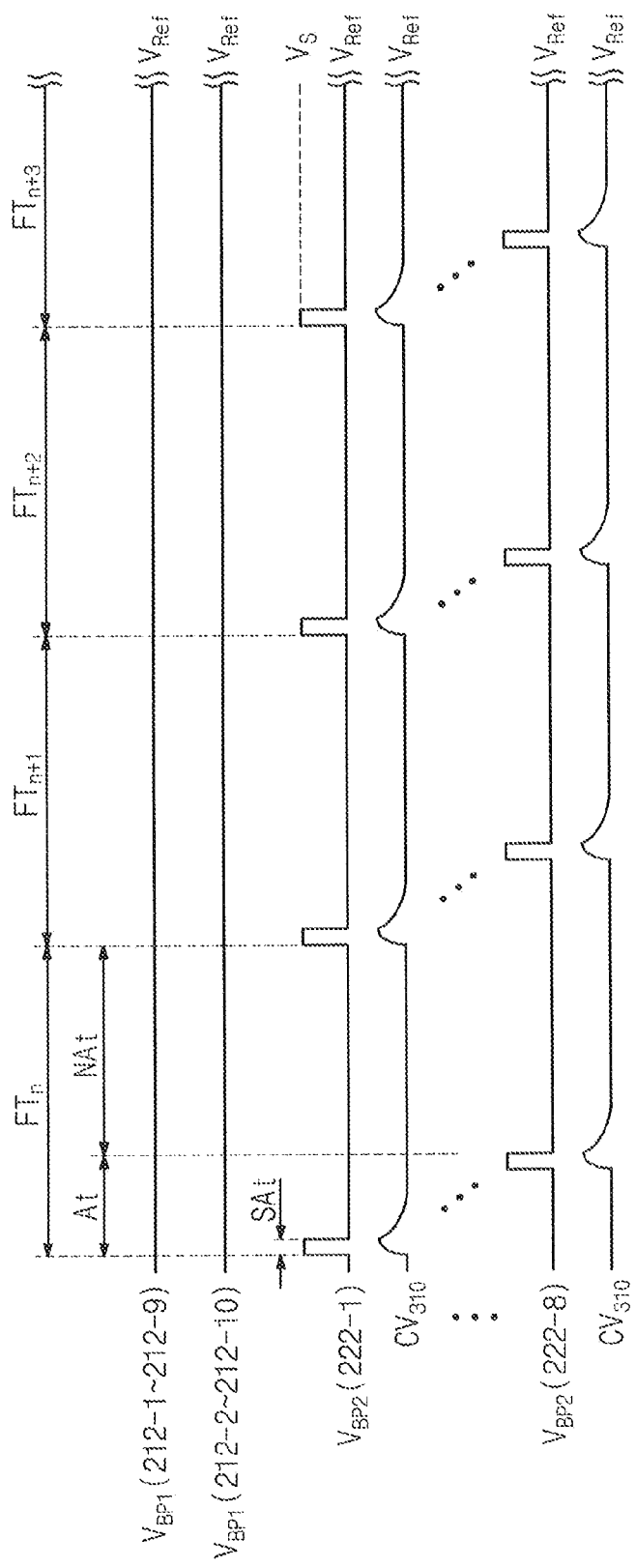
FIG. 9 is a timing diagram showing signals occurring when the barrier panel shown in FIG. 1 is operated in a first mode, according to an exemplary embodiment of the present invention.

Referring to FIG. 9, the driving voltage $V_{BP}$ includes a first driving voltage $V_{BP1}$ and a second driving voltage $V_{BP2}$. The first driving voltage $V_{BP1}$ is applied to the first electrodes 212-1 to 212-10 through the first wire 212-CL1 and the second wire 212-CL2 during the frame periods $FT_n$, $FT_{n+1}$, $FT_{n+2}$, and $FT_{n+3}$. The first driving voltage $V_{BP1}$ may have a first voltage level $V_{Ref}$ as a reference voltage. The first driving voltage $V_{BP1}$ may be a ground voltage and uniformly maintained during the frame periods $FT_n$, $FT_{n+1}$, $FT_{n+2}$, and $FT_{n+3}$.

The second driving voltage $V_{BP2}$ is applied to the second electrodes 222-1 to 222-8 through the third wires 222-CL. The second driving voltage $V_{BP2}$ is sequentially applied to the second electrodes 222-1 to 222-8 during a portion of the frame periods $FT_n$, $FT_{n+1}$, $FT_{n+2}$, and $FT_{n+3}$. In each of the frame periods $FT_n$, $FT_{n+2}$, and $FT_{n+3}$, a period during which the second driving voltage $V_{BP2}$ is applied to the second electrodes 222-1 to 222-8 is defined as a first period At, and a remainder of the period is defined as a second period NAt.

The second driving voltage $V_{BP2}$ is activated during a portion SAt of the first period At. For example, the second driving voltage $V_{BP2}$ has a second voltage level $+V_S$ higher than the first voltage level $V_{Ref}$ during the portion SAt of the first period At, and has the first voltage level $V_{Ref}$ during a remaining period of the first period At. In an exemplary embodiment, the first period At may be the same as each of the frame periods $FT_n$, $FT_{n+1}$, $FT_{n+2}$, and $FT_{n+3}$.

As shown in FIG. 9, since the portion SAt of the first period At in which the second driving voltage $V_{BP2}$ is activated is shorter than the frame periods $FT_n$, $FT_{n+1}$, $FT_{n+2}$, and $FT_{n+3}$, the barrier panel 200 substantially does not form the barrier pattern. Accordingly, the barrier panel 200 transmits the first image generated by the display panel 100 during the normally white mode without modification.

As shown in FIGS. 8 and 4, the coordinate calculator CCP is electrically connected to the third electrodes 310 through the fourth wires 310-CL. The third control signal CT3 may be applied to the coordinate calculator CCP.

The coordinate calculator CCP senses the variation of the capacitance of the capacitor formed at every position at which the second electrodes 222 cross the third electrodes 310. The variation of the capacitance is sensed by the coordinate calculator CCP by measuring a voltage variation $CV_{310}$ occurring on the third electrodes 310.

Hereinafter, a method of calculating the coordinate information of the touch point using the coordinate calculator CCP will be described with reference to FIGS. 9 to 11C.

Figure 10:
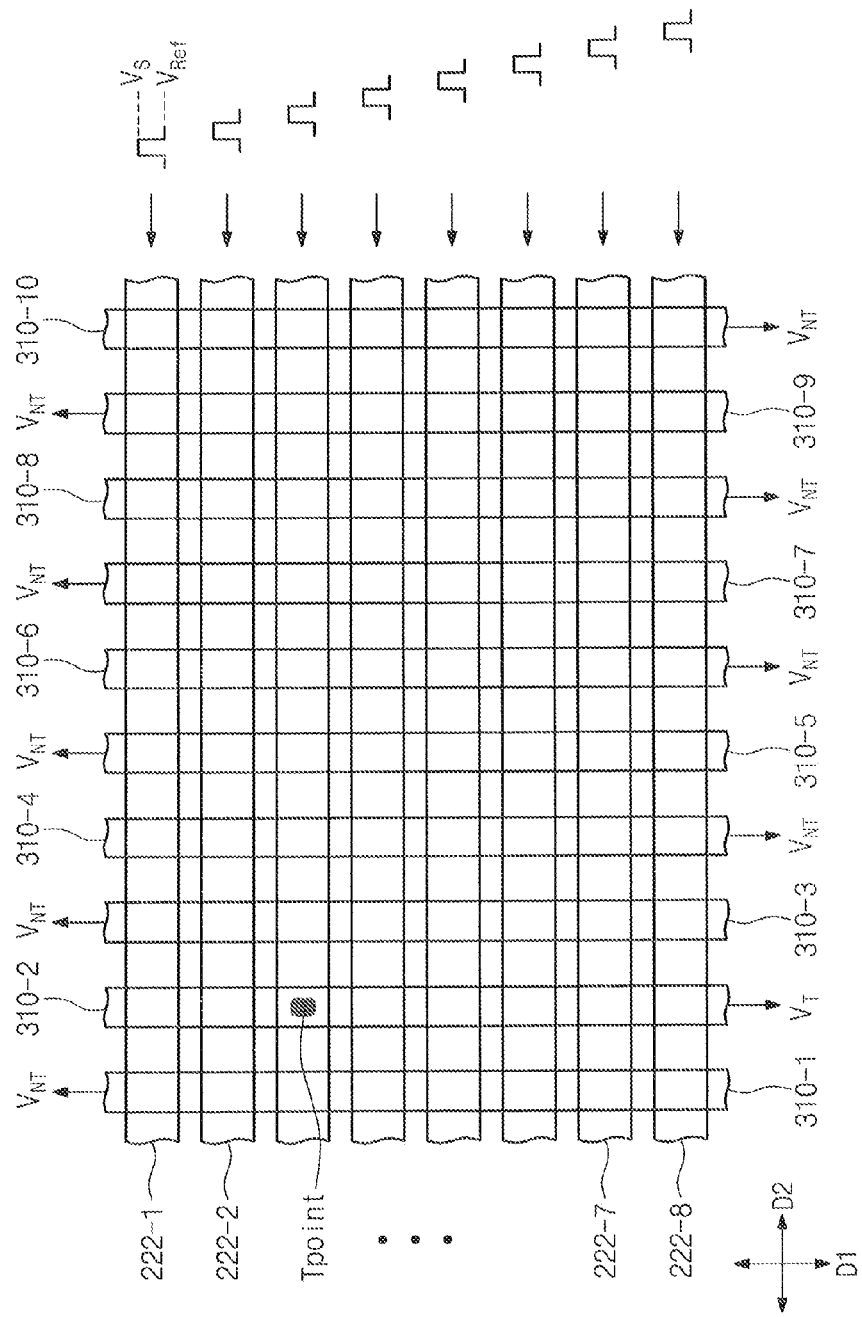
FIG. 10 is a view showing the touch sensing part shown in FIG. 8 in which a touch event occurs, according to an exemplary embodiment of the present invention.
Figure 11A:
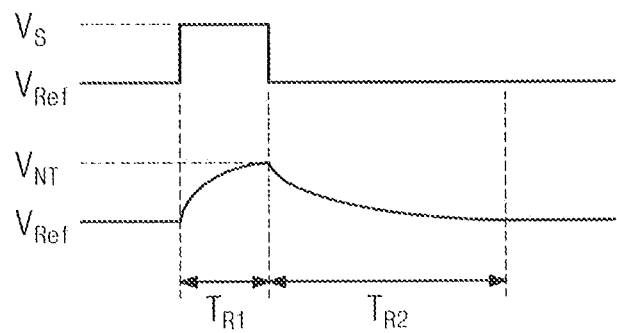
FIGS. 11A to 11C are timing diagrams showing a variation of a signal level when a touch event occurs, according to an exemplary embodiment of the present invention.
Figure 11B:
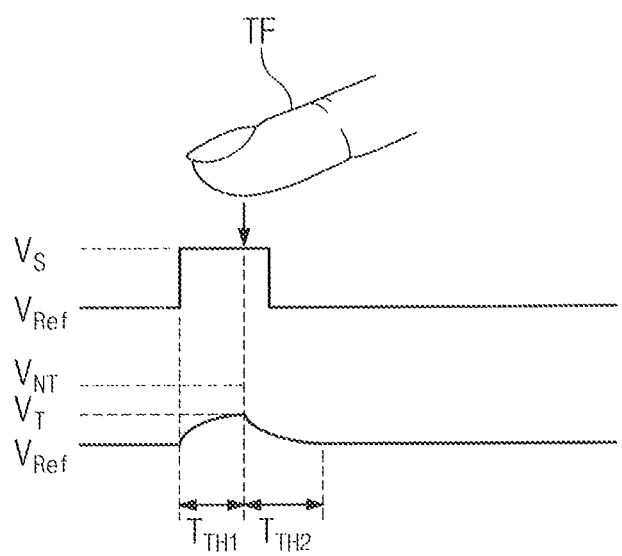
Figure 11C:
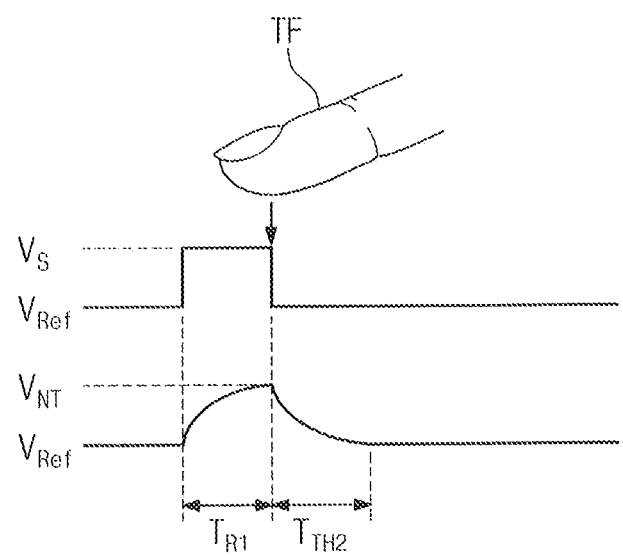

FIG. 10 is a view showing the touch sensing part shown in FIG. 8 in which the touch event occurs, according to an exemplary embodiment of the present invention. FIGS. 11A to 11C are timing diagrams showing the variation of signal level when the touch event occurs, according to exemplary embodiments of the present invention.

The voltage at the first voltage level $V_{Ref}$ may be applied to the third electrodes 310-1 to 310-10 before the second driving voltage $V_{BP2}$ is applied to the second electrodes 222-1 to 222-8.

When the second driving voltage $V_{BP2}$ is applied to the second electrodes 222-1 to 222-8, the level of the voltage of the third electrodes 310-1 to 310-10 is changed by the capacitance-coupling operation. For example, when the second driving voltage $V_{BP2}$ is applied to one of the second electrodes 222 (e.g., the second electrode 222-1 disposed at an uppermost position of the second electrodes 222 shown in FIG. 3B), the capacitance-coupling operation occurs at every position at which the second electrode 222-1 disposed at the uppermost position crosses the third electrodes 310.

Due to the capacitance coupling between the second electrode 222-1 disposed at the uppermost position and the third electrodes 310-1 to 310-10, an electric potential of each of the third electrodes 310-1 to 310-10 is increased during a predetermined period, and then decreased during a predetermined period.

As shown in FIG. 11A, a period $T_{R1}$, in which the electric potential of one of the third electrodes 310-1 to 310-10 increases, may correspond to the portion SAt of the first period At in which the second driving voltage $V_{BP2}$ is activated. During a period $T_{R2}$, electric charges charged in the capacitor are naturally discharged.

FIG. 10 is a view showing the touch sensing part 300 shown in FIG. 8 in which the touch event occurs. For convenience of explanation, it is assumed that the touch event occurs at the area in which a third second-electrode 222-3 among the second electrodes 222-1 to 222-8 crosses a second third-electrode 310-2 among the third electrodes 310-1 to 310-10.

As shown in FIG. 11A, when the touch event does not occur, the level of the voltage of the third electrodes 310-1 to 310-10 is increased by applying the second driving voltage $V_{BP2}$ to the second electrodes 222. A time period in which the electric potential of each of the third electrodes 310-1 to 310-10 increases is defined as a charge time period $T_{R1}$, and a maximum voltage occurring at each of the third electrodes 310-1 to 310-10 is defined as a non-touch voltage $V_{NT}$. In addition, a time period in which the non-touch voltage $V_{NT}$ is decreased to the voltage before the capacitance coupling occurs (e.g., the reference voltage at the first level $V_{Ref}$) is defined as a reference discharge time period $T_{R2}$.

The non-touch voltage $V_{NT}$ and the reference discharge time period $T_{R2}$ are previously set in the coordinate calculator CCP.

The coordinate calculator CCP detects the maximum voltage occurring at each of the third electrodes 310-1 to 310-10, and compares the maximum voltage with the non-touch voltage $V_{NT}$. When the level of the detected maximum voltage is substantially equal to the level of the non-touch voltage $V_{NT}$, the coordinate calculator CCP determines that no touch event has occurred.

As shown in FIG. 11B, when the maximum voltage $V_T$ (hereinafter, referred to as touch voltage) having a voltage level smaller than that of the non-touch voltage $V_{NT}$ is detected, the coordinator calculator CCP determines that the touch event occurs.

When an input member TF such as, for example, a finger of the viewer, is placed on the touch sensing part 300, an electric field formed in the capacitor disposed under the input member TF is discharged to the input member TF. Accordingly, the capacitance of the capacitor disposed under the input member TF is decreased.

The coordinate calculator CCP calculates the coordinate information in the first direction D1 on the basis of the time period at which the touch voltage VT is detected and the time period corresponding to the first period At.

For example, in a display panel operating at a frequency of 60 Hz, each of the frame periods $FT_n$, $FT_{n+2}$, and $FT_{n+3}$ may be about 0.0167 seconds. In an exemplary embodiment according to FIG. 9, when the first period At is about 0.0024 seconds, each of the eight second electrodes 222-1 to 222-8 is applied with the activated second driving voltage $V_{BP2}$ in about 0.0003 seconds.

When the touch event occurs at the touch point Tpoint shown in FIG. 10, the touch voltage $V_T$ is measured within a time period of about 0.0003 seconds to about 0.0006 seconds from a start point (0 seconds) of each frame period. If the touch voltage $V_T$ is detected after a lapse of the time period of about 0.0005 seconds, it is determined that the touch point Tpoint is positioned at the third second-electrode 222-3 of the eight second electrodes 222-1 to 222-8.

The coordinate information in the first direction D1 according to the positions of the second electrodes 222-1 to 222-8 is previously set in the coordinate calculator CCP. The coordinate calculator CCP specifies the third second-electrode 222-3 disposed under the touch point Tpoint among the eight second electrodes 222-1 to 222-8 on the basis of the time period in which the touch voltage $V_T$ is detected. The coordinate calculator CCP calculates the coordinate information in the first direction D1 of the touch point Tpoint on the basis of the coordinate information of the first direction D1 of the specified third second-electrode 222-3.

The coordinate calculator CCP calculates the coordinate information in the second direction D2 of the touch point Tpoint on the basis of the second third-electrode 310-2 from which the touch voltage $V_T$ is measured. The coordinate information of the second direction D2 according to the positions of the third electrodes 310-1 to 310-10 is previously set in the coordinate calculator CCP. The coordinate calculator CCP specifies the second third-electrode 310-2 from which the touch voltage $V_T$ is detected, and calculates the coordinate information of the second direction D2 of the touch point Tpoint on the basis of the coordinate information of the second direction D2 of the specified second third-electrode 310-2.

In addition, as shown in FIG. 11B, the coordinate calculator CCP measures a discharge time period $T_{TH2}$ of the third electrodes 310-1 to 310-10, and calculates the coordinate information of the first direction D1 of the touch point Tpoint on the basis of the discharge time period $T_{TH2}$ shorter than the reference discharge time period $T_{R2}$.

The touch voltage $V_T$ is a maximum voltage in a touch time period $T_{TH1}$. Because the touch time period $T_{TH1}$ is shorter than the charge time period $T_{R1}$ (refer to FIG. 11A) and/or the portion SAt of the first period At (refer to FIG. 9), the touch voltage $V_T$ is lower than the non-touch voltage $V_{NT}$. The method of calculating the coordinate information of the first direction D1 based on the measured discharge time period $T_{TH2}$ is substantially the same as the method of calculating the coordinate information of the first direction D1 based on the measured time period in which the touch voltage $V_T$ is measured.

As shown in FIG. 11C, although the touch event occurs after the charge time period $T_{R1}$, the coordinate information of the touch point Tpoint in the first direction D1 may be calculated by measuring the discharge time period $T_{TH2}$ of the third electrodes 310-1 to 310-10.

Figure 12A:
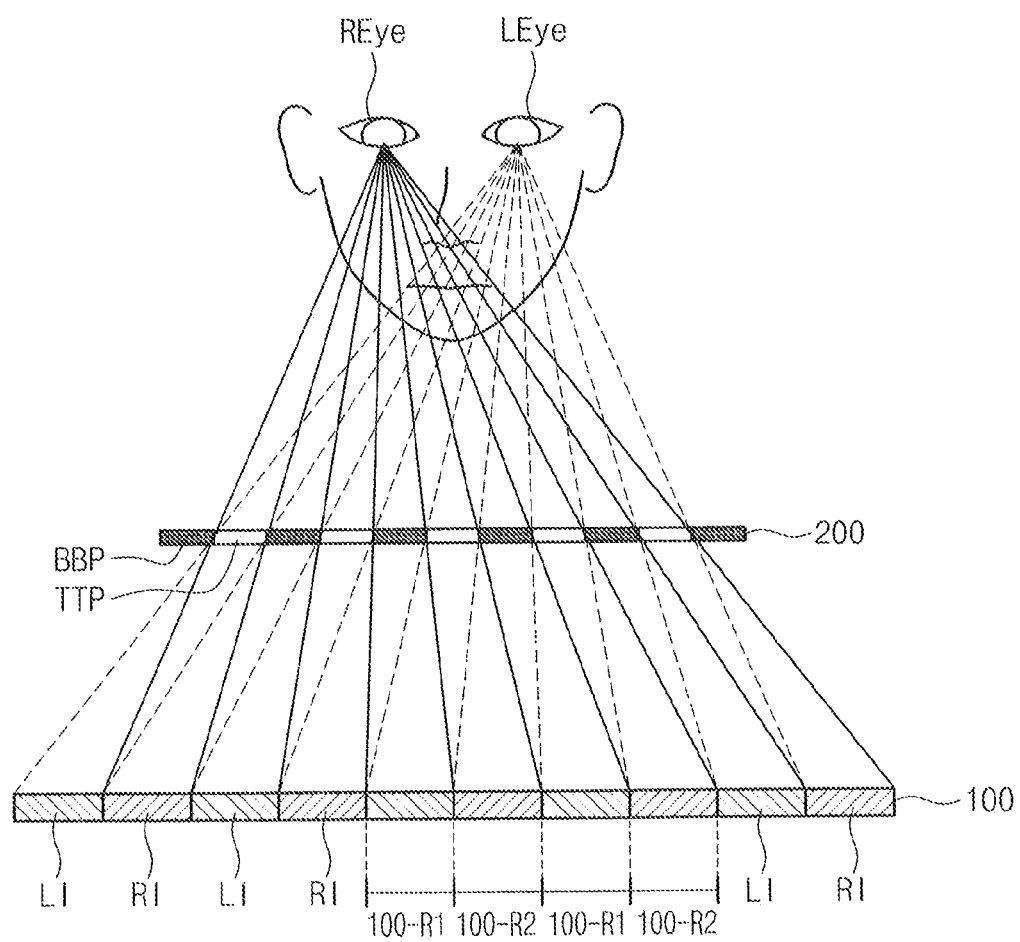
FIGS. 12A and 12B are views showing a display apparatus that displays a second image, according to an exemplary embodiment of the present invention.
Figure 12B:
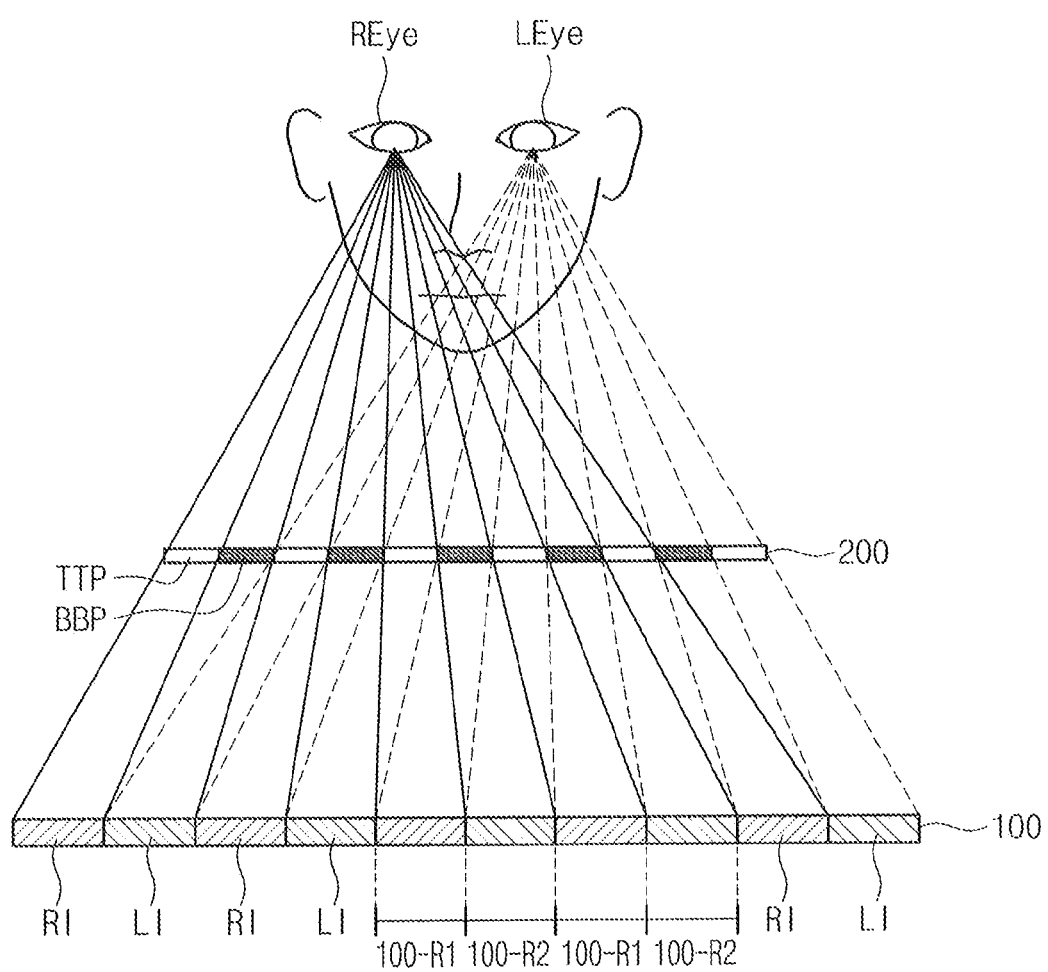

Hereinafter, the display panel 100 operated in the 3D mode and the barrier panel 200 operated in the second mode will be described with reference to FIGS. 1, 12A, and 12B. FIGS. 12A and 12B are views showing a display apparatus that displays a second image.

As shown in FIG. 1, the timing controller TCP receives the input image signal RGB and the various control signals CS from the external graphic controller. The timing controller TCP controls the gate driver GCP and the data driver DCP in the 2D mode in response to the 2D mode selection signal provided through the user interface, or the 2D identification code extracted from the input image signal RGB.

The control signals CS may include a focal length determination signal used to determine a focal length of the 3D image. The timing controller TCP applies the focal length determination signal to the data driver DCP and the barrier panel driver 200-C.

The timing controller TCP converts the input image signal ROB to left-eye image data RGB-L and right-eye image data RGB-R in the 3D mode. The timing controller TCP outputs the left-eye image data RGB-L and the right-eye image data RGB-R to the data driver DCP. In addition, the timing controller TCP applies the second control signal CT2 including the 3D synchronization signal and the focal length determination signal to the data driver DCP.

In addition, the timing controller TCP applies the first control signal CT1 including the 3D synchronization signal to the gate driver GCP and applies the third control signal CT3 including the 3D synchronization signal and the focal length determination signal to the barrier panel driver 200-C.

As shown in FIG. 6, the gate driver GCP sequentially outputs the gate voltage to the gate lines GL1 to GLn in response to the first control signal CT1.

The data driver DCP converts the left-eye image data RGB-L and the right-eye image data RGB-R to a left-eye data voltage and a right-eye data voltage, respectively, and outputs the left-eye data voltage and the right-eye data voltage to the data lines DL1 to DLm.

The display panel 100 is divided into a plurality of display areas, each of which extends in the first direction D1 in the 3D mode. As shown in FIG. 5, each of the pixel columns $PXC_1$ to $PXC_m$ may form the display area.

Referring to FIG. 12A, the display areas are classified into first areas 100-R1 and second areas 100-R2, which display different images from each other. The first areas 100-R1 display one of the left-eye image LI and the right-eye image RI, and the second areas 100-R2 display the other one of the left-eye image LI and the right-eye image RI. The first areas 100-R1 may be alternately arranged with the second areas 100-R2. For example, the first areas 100-R1 correspond to odd-numbered pixel columns $PXC_1$ to $PXC_{m-1}$, and the second areas 100-R2 correspond to even-numbered pixel columns $PXC_2$ to $PXC_m$.

As shown in FIG. 12A, the first areas 100-R1 display the left-eye image LI and the second areas 100-R2 display the right-eye image RI during one frame period. In addition, as shown in FIG. 12B, during another frame period, the first areas 100-R1 display the right-eye image RI and the second areas 100-R2 display the left-eye image LI.

When the display panel 100 is driven at a high frequency (e.g., 120 Hz) in the 3D mode, the first and second areas 100-R1 and 100-R2 respectively display the left-eye image LI and the right-eye image RI at a first time point of the frame period, and the first and second areas 100-R1 and 100-R2 respectively display the right-eye image RI and the left-eye image LI at a second time point of the frame period, which is different from the first time point.

The barrier panel 200 is synchronized with the display panel 100, and the barrier pattern is formed. The barrier pattern provides the left-eye image LI to the left eye LEye of the viewer and the right-eye image RI to the right eye REye of the viewer.

The barrier pattern includes the block part BBP and the transmission part TTP. The block part BBP is alternately arranged with the transmission part TTP. The arrangement of the liquid crystal molecules in the block part BBP is different from that in the block part TTP.

The block part BBP is the area in which the arrangement of the liquid crystal molecules of the liquid crystal layer 230 shown in FIG. 2 is varied by applying different voltages to the first electrodes 212 and the second electrodes 222, and the transmission part TTP is the area in which the arrangement of the liquid crystal molecules of the liquid crystal layer 230 shown in FIG. 2 is not varied by applying the same voltages to the first electrodes 212 and the second electrodes 222.

During the normally white mode, the light passing through the second polarizing plate P2 of the barrier panel 200 is not phase-delayed while passing through the block part BBP. Accordingly, the light passing through the block part BBP may not pass through the third polarizing plate P3 having a transmission axis different from that of the second polarizing plate P2. On the other hand, the light passing through the second polarizing plate P2 is phase-delayed while passing through the transmission part TTP. Thus, the light passing through the transmission part TTP may pass through the third polarizing plate P3 having the transmission axis different from that of the second polarizing plate P2.

The barrier panel 200 forms a first barrier pattern and a second barrier pattern, which are different from each other, as shown in FIGS. 12A and 12B. Each of the first and second barrier patterns includes the block part BBP and the transmission part TTP.

The arrangement of the block part BBP and the transmission part TTP in the first barrier panel is different from the arrangement of the block part BBP and the transmission part TTP. As shown in FIG. 12A, the block part BBP and the transmission part TIT are alternately arranged with each other starting from the left side in the first barrier pattern. The first barrier pattern provides the left-eye image LI displayed in the first areas 100-R1 to the left eye LEye of the viewer and the right-eye image RI displayed in the second areas 100-R2 to the right eye REye of the viewer.

As shown in FIG. 12B, the transmission part TTP and the block part BBP are alternately arranged with each other starting from the left side in the second barrier pattern. The second barrier pattern provides the right-eye image RI displayed in the first areas 100-R1 to the right eye REye of the viewer and the left-eye image LI displayed in the second areas 100-R2 to the left eye LEye of the viewer.

FIG. 13 is a timing diagram showing signals occurring when the barrier panel shown in FIG. 1 is operated in the second mode, according to an exemplary embodiment of the present invention. The method of calculating the first barrier pattern, the second barrier pattern, and the coordinate information of the touch point will be described in further detail with reference to FIG. 13. Hereinafter, among the frame periods $FT_n$, $FT_{n+1}$, $FT_{n+2}$, and $FT_{n+3}$, an n-th frame period $FT_n$ is referred to as a present frame period, and an (n+1)th frame period $FT_{n+1}$ is referred to as a next frame period.

In the second mode, the first electrodes 212-1 to 212-10 shown in FIG. 3A are divided into a first electrode group and a second electrode group, which are alternately arranged with each other. The first electrode group includes odd-numbered first electrodes 212-1 to 212-9 of the first electrodes 212-1 to 212-10, and the second electrode group includes even-numbered first electrodes 212-2 to 212-10, or vice versa.

As shown in FIG. 13, the first electrode group of the first electrodes 212-1 to 212-9 receives a voltage from the barrier panel driver 200-C, which has a voltage level different from that of a voltage applied to the second electrode group of the first electrodes 212-2 to 212-10.

For example, during the present frame period $FT_n$, the first electrode group of the first electrodes 212-1 to 212-9 receives a third driving voltage $V_{BP3}$, and the second electrode group of the first electrodes 212-2 to 212-10 receives a fourth driving voltage $V_{BP4}$.

The third driving voltage $V_{BP3}$ has a first voltage level $-V_D$, and the fourth driving voltage $V_{BP4}$ has a second voltage level $V_{Ref}$. The fourth driving voltage $V_{BP4}$ may be a ground voltage and may be used as a reference voltage, and the third driving voltage $V_{BP3}$ has a negative (−) polarity with respect to the fourth driving voltage $V_{BP4}$.

The second electrodes 222-1 to 222-8 sequentially receive a fifth driving voltage $V_{BP5}$ during the first period At, which is activated in the portion SAt of the first period At.

For example, in the present frame period $FT_n$, the fifth driving voltage $V_{BP5}$ has a third voltage level $-V_S$ during the portion SAt of the first period At, and has the second level $V_{Ref}$ during the remaining period. According to FIG. 13, during the present frame period $FT_n$, the fifth driving voltage $V_{BP5}$ has a negative (−) polarity with respect to the reference voltage during the portion SAt in which the fifth driving voltage $V_{BP5}$ is activated, however, exemplary embodiments are not limited thereto. For example, the fifth driving voltage $V_{BP5}$ may have a positive (+) polarity with respect to the reference voltage during the portion SAt in which the fifth driving voltage $V_{BP5}$ is activated.

The third driving voltage $V_{BP3}$ applied to each of the first electrodes in the first electrode group 212-1 to 212-9 has a voltage level different from that of the fifth driving voltage $V_{BP5}$ applied to each of the second electrodes 222-1 to 222-8 during the present frame period $FT_n$, except for the portion SAt in which the fifth driving voltage $V_{BP5}$ is activated. Accordingly, the arrangement of the liquid crystal molecules of the liquid crystal layer 230 disposed in the area where the first electrode group of the first electrodes 212-1 to 212-9 crosses the second electrodes 222-1 to 222-8 is changed. That is, the block part BBP is formed in the area that the first electrode group of the first electrodes 212-1 to 212-9 crosses the second electrodes 222-1 to 222-8.

The fourth driving voltage $V_{BP4}$ applied to each of first electrodes in the second electrode group 212-2 to 212-10 has the same level as that of the fifth driving voltage $V_{BP5}$ applied to each of the second electrodes 222-1 to 222-8 during the present frame period $FT_n$, except for the portion SAt in which the fifth driving voltage $V_{BP5}$ is activated. Thus, the arrangement of the liquid crystal molecules of the liquid crystal layer 230 disposed in the area where the second group the first electrodes 212-2 to 212-10 crosses the second electrodes 222-1 to 222-8 is not changed. That is, the transmission part TTP is formed in the area that the second group of the first electrodes 212-2 to 212-10 crosses the second electrodes 222-1 to 222-8.

Consequently, during the present frame period $FT_n$, the barrier panel 200 forms the first barrier pattern in which the block part BBP and the transmission part TTP are alternately arranged with each other, as shown in FIG. 12A.

The reference voltage of the first voltage level $-V_D$ is applied to the third electrodes 310 shown in FIG. 8 before the fifth driving voltage $V_{BP5}$ is applied to the second electrodes 222-1 to 222-8. The second electrodes 222-1 to 222-8 are capacitively coupled to the third electrodes 310 during the portion SAt in which the fifth driving voltage $V_{BP5}$ is activated.

The coordinate calculator CCP measures the variation of the voltage in the third electrodes 310, and calculates the coordinate information of the touch point Tpoint using the method described with reference to FIGS. 11A to 11C.

During the next frame period $FT_{n+1}$, the first group of the first electrodes 212-1 to 212-9 receives the third driving voltage $V_{BP3}$ of the second voltage level $V_{Ref}$ and the second group of the first electrodes 212-2 to 212-10 receives the fourth driving voltage $V_{BP4}$ of the fourth voltage level $+V_D$. The third driving voltage $V_{BP3}$ of the first voltage level $-V_D$ and the fourth driving voltage $V_{BP4}$ of the fourth voltage level $+V_D$ may have a polarity opposite to that of the reference voltage of the second voltage level $V_{Ref}$.

In addition, the fifth driving voltage $V_{BP5}$ has the fifth voltage level $+V_S$ during the portion SAt in which the fifth driving voltage $V_{BP5}$ is activated, and has the second voltage level $V_{Ref}$ during a remaining period. The third driving voltage $V_{BP3}$ of the third voltage level $-V_S$ and the fifth driving voltage $V_{BP3}$ of the fifth voltage level $+V_S$ may have a polarity opposite to that of the reference voltage of the second voltage level $V_{Ref}$.

The third driving voltage $V_{BP3}$ applied to the first group of the first electrodes 212-1 to 212-9 and the fifth driving voltage $V_{BP5}$ applied to the second electrodes 222-1 to 222-8 have substantially the same voltage level during the next frame period $FT_{n+1}$, except for the portion SAt in which the fifth driving voltage $V_{BP5}$ is activated. Accordingly, the transmission part TTP is formed in the area that the first group of the first electrodes 212-1 to 212-9 crosses the second electrodes 222-1 to 222-8.

The third driving voltage $V_{BP3}$ applied to the second group of the first electrodes 212-2 to 212-10 has a different voltage level from that of the fifth driving voltage $V_{BP5}$ applied to the second electrodes 222-1 to 222-8 during the next frame period $FT_{n+1}$, except for the portion SAt in which the fifth driving voltage $V_{BP5}$ is activated. Thus, the block part BBP is formed in the area that the second group of the first electrodes 212-2 to 212-10 crosses the second electrodes 222-1 to 222-8.

As shown in FIG. 12B, the barrier panel 200 forms the second barrier pattern in which the transmission part TTP and the block part BBP are alternately arranged with each other during the next frame period $FT_{n+1}$.

The width of the transmission part TTP and the block part BBP in the second direction D2 may be changed. For example, the first electrodes 212-1 to 212-10 may be divided into the first electrode group and the second electrode group in multiples of 2. Accordingly, in an exemplary embodiment, the first electrode group may include first, second, fifth, sixth, ninth, and tenth first electrodes 212-1, 212-2, 212-5, 212-6, 212-9, and 212-10, and the second electrode group may include third, fourth, seventh, and eighth first electrodes 212-3, 212-4, 212-7, and 212-8. When the third driving voltage is applied to the first, second, fifth, sixth, ninth, and tenth first electrodes 212-1, 212-2, 212-5, 212-6, 212-9, and 212-10 of the first electrode group, and the fourth driving voltage is applied to the third, fourth, seventh, and eighth first electrodes 212-3, 212-4, 212-7, and 212-8 of the second electrode group, the width of the transmission part TTP and the block part BBP increases.

In addition, the pixel columns $PXC_1$ to $PXC_m$ of the first areas 100-R1 and the second areas 100-R2 of the display area may also be divided into groups in multiples of 2.

The width in the second direction D2 of the transmission part TTP and the block part BBP, and the width in the second direction D2 of the first areas 100-R1 and the second areas 100-R2, may be changed by the focal length determination signal used to vary the focal length. The focal length is determined based on the distance between the viewer and the display panel 100 or the barrier panel 200.

Figure 15:
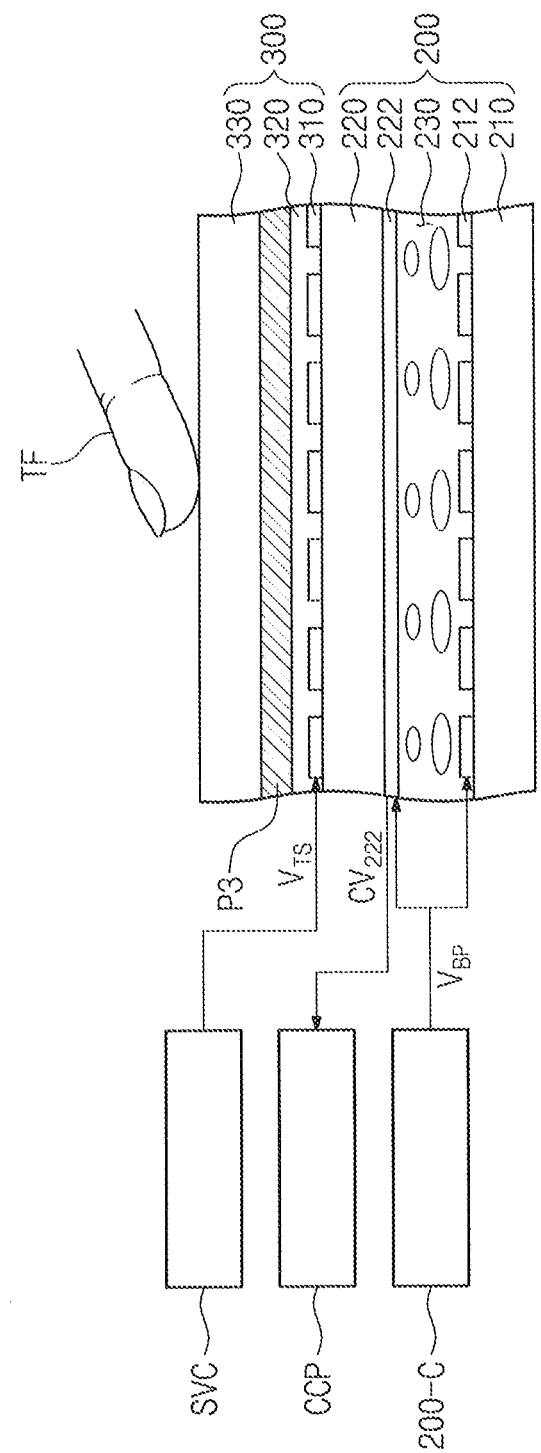
FIG. 15 is a view showing a signal transmission path in a barrier panel and a touch sensing part, according to an exemplary embodiment of the present invention.
Figure 16:
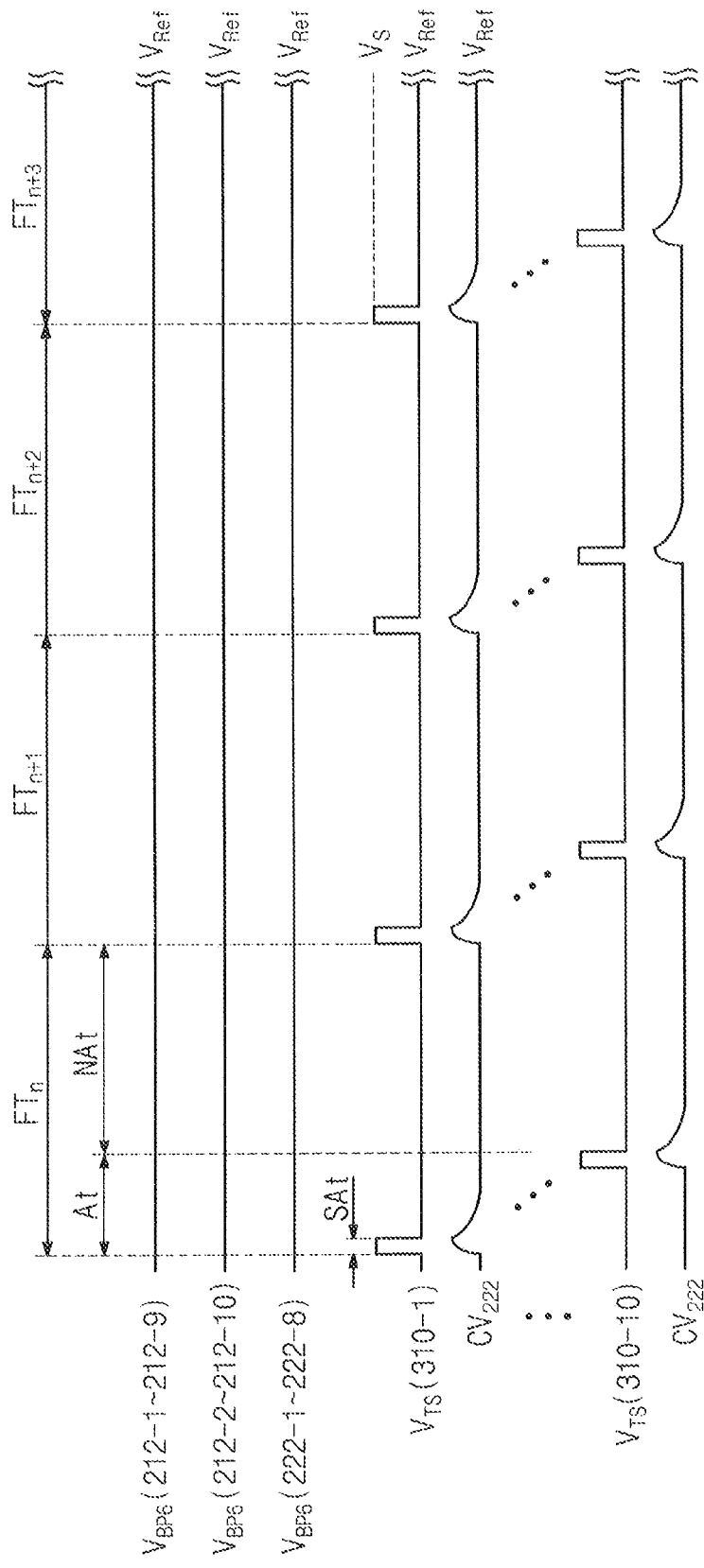
FIG. 16 is a timing diagram showing signals occurring when the barrier panel shown in FIG. 15 is operated in a first mode, according to an exemplary embodiment of the present invention.

FIG. 14 is a block diagram showing a display apparatus, according to an exemplary embodiment of the present invention. FIG. 15 is a view showing a signal transmission path in a barrier panel and a touch sensing part, according to an exemplary embodiment of the present invention. FIG. 16 is a timing diagram showing signals occurring when the barrier panel shown in FIG. 15 is operated in a first mode, according to an exemplary embodiment of the present invention. FIG. 17 is a timing diagram showing signals occurring when the barrier panel shown in FIG. 15 is operated in a second mode, according to an exemplary embodiment of the present invention. In FIGS. 14 to 17, the same reference numerals may denote the same elements in FIGS. 1 to 13, and thus, detailed descriptions of the same elements may be omitted.

Referring to FIG. 14, the display apparatus includes a display panel 100, a barrier panel 200, a touch sensing part 300, a coordinate calculator CCP, and a barrier panel driver 200-C. In addition, the display apparatus further includes a sensing voltage supply part SVC that applies a sensing voltage $V_{TS}$ to third electrodes 310.

Referring to FIG. 15, the barrier panel driver 200-C applies a driving voltage $V_{BP}$ to first electrodes 212 and second electrodes 222.

As shown in FIG. 16, in the first mode, the first electrodes 212 and the second electrodes 222 receive the same first driving voltage $V_{BP6}$ of a first voltage level $V_{Ref}$ from the barrier panel driver 200-C during a present frame period $FT_n$. The first driving voltage $V_{BP6}$ may be a ground voltage used as a reference voltage. Since an electric field is not formed between the first electrodes 212 and the second electrodes 222, the barrier panel 200 does not form the barrier pattern in the first mode.

The sensing voltage supply part SVC sequentially applies the sensing voltage $V_{TS}$ to the third electrodes 310 during a first period At. The first period At may be the same as the present frame period $FT_n$.

The sensing voltage $V_{TS}$ is activated in a portion SAt of the first period At. That is, the sensing voltage $V_{TS}$ has a second voltage level $+V_S$ higher than the first voltage level $V_{Ref}$ during the portion SAt of the first period At, and has the first voltage level $V_{Ref}$ during a remaining portion of the first period At.

The coordinate calculator CCP is electrically connected to each of the second electrodes 222. When the sensing voltage $V_{TS}$ is applied to the third electrodes 310, the capacitor is formed at every position at which the second electrodes 222 cross the third electrodes 310.

The coordinate calculator CCP measures the variation of the voltage $CV_{222}$ in the second electrodes 222, detects the variation of the capacitance of the capacitor, and calculates the coordinate information based on the touch point. The method of calculating the coordinate information of the touch point may be the same as the method described with reference to FIGS. 11A to 11C.

In the exemplary embodiment described above, the coordinate calculator CCP calculates the coordinate information in the second direction D2 of the touch point on the basis of the time period in which the touch voltage $V_T$ is measured, and the time period corresponding to the first period At. In addition, the coordinate calculator CCP calculates the coordinate information in the first direction D1 of the touch voltage $V_T$ from the second electrodes 222 shown in FIG. 15 from which the touch voltage $V_T$ is measured.

As shown in FIG. 17, in the second mode, the first group of the first electrodes 212-1 to 212-9 receives a first driving voltage $V_{BP7}$ of a first voltage level $-V_D$ from the barrier panel driver 200-C during the present frame period $FT_C$. The second group of the first electrodes 212-2 to 212-10 receives a second driving voltage $V_{BP8}$ of the second voltage level $V_{Ref}$ from the barrier panel driver 200-C during the present frame period $FT_n$. In addition, the second electrodes 222-1 to 222-8 receive a third driving voltage $V_{BP9}$ of the second voltage level $V_{Ref}$ from the barrier panel driver 200-C during the present frame period $FT_n$.

The first driving voltage $V_{BP7}$ applied to the first group of the first electrodes 212-1 to 212-9 during the present frame period FT, and the third driving voltage $V_{BP9}$ applied to the second electrodes 222-1 to 222-8 during the present frame period $FT_n$ have different voltage levels from each other. Thus, the arrangement of the liquid crystal molecules of the liquid crystal layer 230 disposed in the areas in which the first group of the first electrodes 212-1 to 212-9 crosses the second electrodes 222-1 to 222-8 is changed. That is, the block part BBP is formed in the areas in which the first group of the first electrodes 212-1 to 212-9 crosses the second electrodes 222-1 to 222-8.

The second driving voltage $V_{BP8}$ applied to the second group of the first electrodes 212-2 to 212-10 during the present frame period $FT_n$ and the third driving voltage $V_{BP9}$ applied to the second electrodes 222-1 to 222-8 during the present frame period $FT_n$ have substantially the same voltage level. Accordingly, the arrangement of the liquid crystal molecules of the liquid crystal layer 230 disposed in the areas in which the second group of the first electrodes 212-2 to 212-10 crosses the second electrodes 222-1 to 222-8 is not changed. That is, the transmission part TTP is formed in the areas in which the second group of the first electrodes 212-2 to 212-10 crosses the second electrodes 222-1 to 222-8.

The sensing voltage supply part SVC sequentially applies the sensing voltage $V_{TS}$ to the third electrodes 310 during the first period At.

The coordinate calculator CCP measures the variation of the voltage in the second electrodes 222-1 to 222-8, detects the variation of the capacitance of the capacitor, and calculates the coordinate information of the touch point on the basis of the variation of the capacitance of the capacitor.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display apparatus, comprising:
a display panel configured to display a first image every frame period in a two-dimensional (2D) mode, and display a second image every frame period in a three-dimensional (3D) mode;
a barrier panel disposed on the display panel and comprising a plurality of first electrodes extending in a first direction and arranged in a second direction crossing the first direction, a plurality of second electrodes extending in the second direction and arranged in the first direction, and a liquid crystal layer disposed between the first and second electrodes, wherein the barrier panel forms a barrier pattern configured to separate the second image into a left-eye image and a right-eye image;
a touch sensing part comprising a plurality of third electrodes disposed on the second electrodes, extending in the first direction, and arranged in the second direction, wherein the third electrodes are capacitively coupled to the second electrodes;
a coordinate calculator configured to detect a variation of a capacitance between the second electrodes and the third electrodes, and calculate coordinate information of a touch point; and
a barrier panel driver configured to apply a driving voltage to the first electrodes and the second electrodes, wherein the coordinate calculator is electrically connected to each of the third electrodes,
wherein the barrier panel is synchronized with the display panel, the barrier panel is configured to transmit the first image when the display panel is operated in the 2D mode, and the barrier panel is configured to form the barrier pattern when the display panel is operated in the 3D mode,
wherein a frame period comprises a first period and a second period, the first electrodes are configured to receive a first driving voltage from the barrier panel driver during the frame period in the 2D mode, the second electrodes are configured to sequentially receive a second driving voltage from the barrier panel driver in the 2D mode, and the second driving voltage is activated during a portion of the first period.

2. The display apparatus of claim 1, wherein
the first driving voltage has a first voltage level,
the second driving voltage has a second voltage level higher than the first voltage level during the portion of the first period, and
the second driving voltage has the first voltage level during a remaining portion of the first period.

3. The display apparatus of claim 1, wherein a voltage level of the third electrodes is varied when the second driving voltage is applied to the second electrodes, and the coordinate calculator is configured to sense a variation of the voltage of the third electrodes.

4. The display apparatus of claim 3, wherein
a non-touch voltage and a reference discharge time period are set in the coordinate calculator,
the non-touch voltage is a maximum voltage of the third electrodes occurring when the touch event is not detected, and
the reference discharge time period is a time period during which the non-touch voltage decreases before the second and third electrodes are capacitively coupled.

5. The display apparatus of claim 4, wherein
the coordinate calculator is configured to measure the maximum voltage in each of the third electrodes when the second driving voltage is applied to the second electrodes, calculate coordinate information in a first direction of the touch point using one of the second electrodes, and calculate coordinate information in a second direction of the touch point using one of the third electrodes.

6. The display apparatus of claim 1, wherein
a frame period comprises a first period and a second period,
the first electrodes are grouped into a first electrode group and a second electrode group in the 3D mode,
the first and second electrode groups are alternately arranged,
the first electrode group is configured to receive a first driving voltage during the frame period,
the second electrode group is configured to receive a second driving voltage, different from the first driving voltage, during the frame period, and
the second electrodes are configured to sequentially receive a third driving voltage activated during a portion of the first period.

7. The display apparatus of claim 6, wherein the first electrode group comprises odd-numbered first electrodes, and the second electrode group comprises even-numbered first electrodes.

8. The display apparatus of claim 6, wherein
the first driving voltage has a first voltage level,
the second driving voltage has a second voltage level different from the first voltage level, and
the third driving voltage has one of the first voltage level and the second voltage level during the portion of the first period, and has the other one of the first voltage level and the second voltage level during a remaining portion of the first period.

9. A display apparatus, comprising:
a display panel configured to display a first image every frame period in a two-dimensional (2D) mode, and display a second image every frame period in a three-dimensional (3D) mode;
a barrier panel disposed on the display panel and comprising a plurality of first electrodes extending in a first direction and arranged in a second direction crossing the first direction, a plurality of second electrodes extending in the second direction and arranged in the first direction, and a liquid crystal layer disposed between the first and second electrodes, wherein the barrier panel forms a barrier pattern configured to separate the second image into a left-eye image and a right-eye image;
a touch sensing part comprising a plurality of third electrodes disposed on the second electrodes, extending in the first direction, and arranged in the second direction, wherein the third electrodes are capacitively coupled to the second electrodes;
a coordinate calculator configured to detect a variation of a capacitance between the second electrodes and the third electrodes, and calculate coordinate information of a touch point;
a barrier panel driver configured to apply a driving voltage to the first electrodes and the second electrodes; and
a sensing voltage supply part configured to apply a sensing voltage to the third electrodes,
wherein
the coordinate calculator is electrically connected to each of the second electrodes,
the barrier panel is synchronized with the display panel,
the barrier panel is configured to transmit the first image when the display panel is operated in the 2D mode,
the barrier panel is configured to form the barrier pattern when the display panel is operated in the 3D mode,
a frame period comprises a first period and a second period,
the first and second electrodes are configured to receive a first driving voltage from the barrier panel driver during the frame period in the 2D mode,
the third electrodes are configured to sequentially receive the sensing voltage from the sensing voltage supply part in the 2D mode,
the sensing voltage is activated during a portion of the first period,
a voltage of the second electrodes is varied when the second driving voltage is applied to the third electrodes, and
the coordinate calculator is configured to sense a variation of the voltage of the second electrodes.

10. A display apparatus, comprising:
a display panel configured to display a first image every frame period in a two-dimensional (2D) mode, and display a second image every frame period in a three-dimensional (3D) mode;
a barrier panel disposed on the display panel and comprising a plurality of first electrodes extending in a first direction and arranged in a second direction crossing the first direction, a plurality of second electrodes extending in the second direction and arranged in the first direction, and a liquid crystal layer disposed between the first and second electrodes, wherein the barrier panel forms a barrier pattern configured to separate the second image into a left-eye image and a right-eye image;
a touch sensing part comprising a plurality of third electrodes disposed on the second electrodes, extending in the first direction, and arranged in the second direction, wherein the third electrodes are capacitively coupled to the second electrodes;
a coordinate calculator configured to detect a variation of a capacitance between the second electrodes and the third electrodes, and calculate coordinate information of a touch point;
a barrier panel driver configured to apply a driving voltage to the first electrodes and the second electrodes; and
a sensing voltage supply part configured to apply a sensing voltage to the third electrodes,
wherein
the coordinate calculator is electrically connected to each of the second electrodes,
the barrier panel is synchronized with the display panel,
the barrier panel is configured to transmit the first image when the display panel is operated in the 2D mode,
the barrier panel is configured to form the barrier pattern when the display panel is operated in the 3D mode,
the first electrodes are grouped into a first electrode group and a second electrode group in the 3D mode, the first and second electrode groups are alternately arranged, the first electrode group is configured to receive the first driving voltage during a frame period, the second electrode group is configured to receive the second driving voltage, different from the first driving voltage, during the frame period, the second electrodes are configured to receive the first driving voltage or the second driving voltage during the frame period, the third electrodes are configured to sequentially receive the sensing voltage from the sensing voltage supply part, a voltage of the second electrodes is varied when the sensing voltage is applied to the third electrodes, and the coordinate calculator is configured to sense a variation of the voltage of the second electrodes.

11. The display apparatus of claim 10, further comprising:
a first polarizing plate disposed under the first electrodes and having a first transmission axis; and
a second polarizing plate disposed on the second electrodes and having a second transmission axis crossing the first transmission axis, wherein the liquid crystal layer is a twisted nematic liquid crystal layer.

* * * * *